United States Patent
Ziraknejad et al.

(10) Patent No.: US 9,923,879 B1
(45) Date of Patent: Mar. 20, 2018

(54) SHARING KEYS

(71) Applicant: MicroStrategy Incorporated, Vienna, VA (US)

(72) Inventors: Siamak Ziraknejad, Reston, VA (US); Hanna Jung, Sterling, VA (US); John Gehret, Washington, DC (US)

(73) Assignee: MicroStrategy Incorporated, Vienna, VA (US)

( * ) Notice: Subject to any disclaimer, the term of this patent is extended or adjusted under 35 U.S.C. 154(b) by 288 days.

(21) Appl. No.: 14/599,162

(22) Filed: Jan. 16, 2015

Related U.S. Application Data

(60) Provisional application No. 61/928,071, filed on Jan. 16, 2014.

(51) Int. Cl.
H04L 29/06 (2006.01)

(52) U.S. Cl.
CPC ............. *H04L 63/06* (2013.01); *H04L 63/08* (2013.01)

(58) Field of Classification Search
CPC . H04L 2209/56; H04L 63/08; H04L 63/0853; H04L 63/18; H04L 63/0838; H04L 63/061; H04L 63/062; H04L 63/0846; H04L 63/0884; H04L 63/0807; H04L 9/088; H04L 9/32; H04W 12/06; H04W 12/08; G06Q 10/02; G06Q 20/3674; G06Q 20/382; G06Q 30/06; G06F 21/34; G06F 21/335; G06F 2221/2103
USPC ........................ 713/168, 185; 726/5, 18, 4, 9
See application file for complete search history.

(56) References Cited

U.S. PATENT DOCUMENTS

| | | | |
|---|---|---|---|
| 6,000,609 A | 12/1999 | Gokcebay et al. |
| 6,862,576 B1 | 3/2005 | Turner et al. |
| 7,012,503 B2 | 3/2006 | Nielsen |
| 7,325,132 B2 | 1/2008 | Takayama et al. |
| 7,337,332 B2 | 2/2008 | Tsuria |
| 7,520,419 B2 | 4/2009 | Libin et al. |
| 8,437,746 B1 | 5/2013 | Breau |
| 8,665,212 B2 | 3/2014 | Lacey |
| 8,909,141 B2 | 12/2014 | Hansen |

(Continued)

OTHER PUBLICATIONS

"Evaluation of the world's first pilot using NFC phones for check-in and hotel room keys," Report, Assa Abloy, retrieved on May 2, 2012.

(Continued)

*Primary Examiner* — Brian F Shaw
(74) *Attorney, Agent, or Firm* — Fish & Richardson P.C.

(57) ABSTRACT

The subject matter described herein can be embodied in a computer-readable medium storing instructions that cause one or more processors to perform operations including receiving, from a client device associated with a user account of a first user, a request to grant a second user access to a key associated with a credential. The credential is associated with the user account of the first user, the request includes an address of the second user, and the key permits access to a resource. The operations include accessing, at a server, a second user account based on the address of the second user, and associating, by the server, the key with the second user account, such that the second user is enabled to access the resource. The operations further include communicating, to the address of the second user, a message indicating that the second user account has been associated with the key.

20 Claims, 12 Drawing Sheets

(56) References Cited

U.S. PATENT DOCUMENTS

| | | | |
|---|---|---|---|
| 9,189,900 | B1 | 11/2015 | Penilla |
| 2002/0180582 | A1 | 12/2002 | Nielsen |
| 2004/0039919 | A1 | 2/2004 | Takayama et al. |
| 2004/0219903 | A1 | 11/2004 | Despain |
| 2005/0088279 | A1 | 4/2005 | Denison et al. |
| 2006/0255910 | A1 | 11/2006 | Fukushima |
| 2007/0096866 | A1 | 5/2007 | Denison et al. |
| 2007/0198430 | A1 | 8/2007 | Takahashi |
| 2007/0247276 | A1 | 10/2007 | Murchison et al. |
| 2008/0109247 | A1 | 5/2008 | Katayama |
| 2008/0142671 | A1 | 6/2008 | Bourrieres et al. |
| 2008/0149711 | A1 | 6/2008 | Griffits et al. |
| 2008/0218350 | A1 | 9/2008 | Flores |
| 2008/0297481 | A1 | 12/2008 | Higginson |
| 2009/0226050 | A1 | 9/2009 | Hughes |
| 2009/0319316 | A1 | 12/2009 | Westerfeld et al. |
| 2010/0071424 | A1 | 3/2010 | Tsuruta |
| 2010/0082491 | A1 | 4/2010 | Rosenblatt et al. |
| 2011/0210818 | A1 | 9/2011 | Denison et al. |
| 2012/0011367 | A1 | 1/2012 | Denison |
| 2012/0109419 | A1 | 5/2012 | Mercado |
| 2012/0322372 | A1 | 12/2012 | Hansen |
| 2013/0009858 | A1 | 1/2013 | Lacey |
| 2013/0120106 | A1 | 5/2013 | Cauwels et al. |
| 2013/0127593 | A1 | 5/2013 | Kuenzi et al. |
| 2013/0132169 | A1 | 5/2013 | Dooley et al. |
| 2013/0211891 | A1 | 8/2013 | Daniel et al. |
| 2013/0212248 | A1 | 8/2013 | Neafsey |
| 2013/0305319 | A1 | 11/2013 | Matthews, III |
| 2013/0312116 | A1 | 11/2013 | Park |
| 2013/0335193 | A1 | 12/2013 | Hanson et al. |
| 2014/0002239 | A1 | 1/2014 | Rayner |
| 2014/0129630 | A1 | 5/2014 | Nikain |
| 2015/0074073 | A1* | 3/2015 | Liu .................. G06Q 50/01 707/706 |

OTHER PUBLICATIONS

'AssaAbloy.com' [online]. "New generation of access control and mobile access control with NFC technology Assa Abloy," Sep. 2011, [retrieved on May 21, 2012]. Retrieved from the Internet: URL<http://www.assaabloy.com/en/com/Press-News/News/2011/NFC-enabled-mobile-access-in-a-physical-access-control-world/>. 2 pages.

'AssaAbloy.com' [online]. "GSMA highlights Assa Abloy NFC mobile keys solutions," 2012, [retrieved on May 21, 2012]. Retrieved from the Internet: URL<http://www.assaabloy.com/en/comlPress-News/News/20121NFC-access-control-high lighted-by-GSMA-at-Mobile-World-Congress/>. 2 pages.

'AssaAbloy.com' [online]. "Keyless entry with Assa Abloy mobile keys for secure and environment friendly access control," 2011, [retrieved on May 21, 2012]. Retrieved from the Internet: URL<http://www.assaabloy.com/en/com/Products/ASSA-ABLOY-Mobile-Keys/>. 2 pages.

AssaAbloy.com [online]. "Assa Abloy Mobile Keys at ISC West Las Vegas," Apr. 2011, [retrieved on May 21, 2012]. Retrieved from the Internet: URL<http://www.assaabloy.com/en/com/Press-News/News/2011/ASSA-ABLOY-Mobile-Keys-Platform-Debuts-at-ISC-West/>. 2 pages.

'AssaAbloy.com' [online]. "Bjorn Hellgren unlocks his hotel room with Assa Abloy Mobile Keys," May 2011, [retrieved on May 21, 2012]. Retrieved from the Internet: URL<http://www.assaabloy.com/en/com/Press-News/News/2011/The-customer-experience-of-ASSA-ABLOY-Mobile-Keys/>. 2 pages.

'GadgetVenue.com' [online]. "Mobile phone car key," Oct. 2008, [retrieved on May 21, 2012]. Retrieved from the Internet: URL<http://www.gadgetvenue.com/mobile-phone-car-key-10011618/>. 3 pages.

Wikipedia, "Certificate authority," Wikipedia [online] Aug. 8, 2012 [retrieved on Aug. 15, 2012]. Retrieved from the Internet: <URL: http://en.wikipedia.org/wild/Certificate_authority>, 4 pages.

Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.

Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.

Wildpedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.

Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.

Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.

Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.

Wildpedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.

Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.

Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.

Wildpedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.

Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.

Campbell (Review: Kwikset's new iPhone compatible Kevo keyless deadbolt lock, 2013, retrieved Jan. 11, 2016 from http://appleinsider.com/articles/13/10/30/review-kwiksets-bluetooth-enabled-kevo-deadbolt-lock).

Brookings (Riding the Mobile Wave: The Future of Mobile Computing a Conversation with CEO of Microstrategy Michael Saylor, 2012, Chapters 1, 5 and 6).

Spencer (Ushering in a New Era of Mobile ID, 2012, retrieved Jan. 8, 2016 from http://mobilemarketingmagazine.com/usheringnew-era-mobile-id).

* cited by examiner

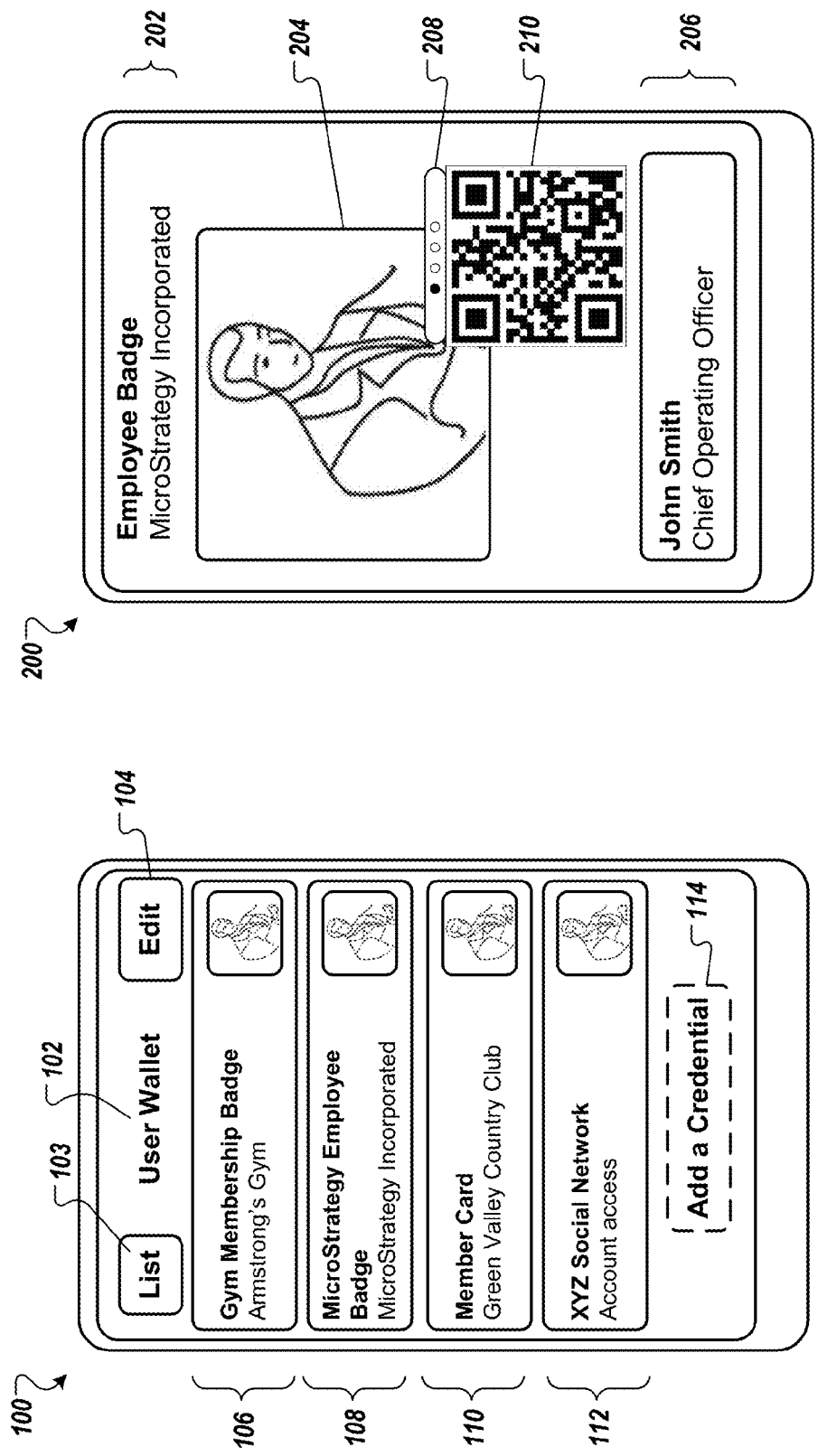

SHARING KEYS

CROSS REFERENCE TO RELATED APPLICATION

This application claims the benefit of U.S. provisional patent application No. 61/928,071, filed on Jan. 16, 2014, which is incorporated by reference herein.

TECHNICAL FIELD

This specification generally relates to user credentials.

BACKGROUND

A person may be associated with a credential that, for example, permits the person to access resources (e.g., physical and/or logical resources) and/or events.

SUMMARY

In general, one aspect of the subject matter described in this specification includes a non-transitory computer-readable storage medium including instructions, which upon execution by one or more processors, cause the one or more processors to perform operations including receiving, from a client device associated with a user account of a first user, a request to grant a second user access to a key associated with a credential. The credential is associated with the user account of the first user, the request includes an address of the second user, and the key permits access to a resource. The operations also include accessing, at a server, a second user account based on the address of the second user, and associating, by the server, the key with the second user account, such that the second user is enabled to access the resource. The operations further include communicating, to the address of the second user, a message indicating that the second user account has been associated with the key.

In another aspect, the subject matter described in this specification includes a non-transitory computer-readable storage medium including instructions, which upon execution by one or more processors, cause the one or more processors to perform operations including receiving, at a client device of a first user, a selection of a key associated with a credential. The credential is associated with a user account of the first user, and the key permits access to a resource. The operations also include providing, at the client device, an interface configured to allow the first user to share the selected key with one or more other users based on an address associated with each of the one or more other users, and receiving, at the client device, a selection of a second user from among the one or more other users. The operations further include transmitting, from the client device to a server, a request for the second user to be granted access to the key wherein the request includes the respective address of the second user, and receiving, from the server, a message confirming that the second user has been granted access to the key.

In another aspect, the subject matter described in this specification includes a non-transitory computer-readable storage medium including instructions, which upon execution by one or more processors, cause the one or more processors to perform operations including receiving, at a client device associated with a user account of a first user, a notification indicating receipt of a key associated with a credential. The credential is associated with a second user, the notification is directed to an address associated with the first user and includes a control configured to allow an initiation of access to the key, and the key permits access to a resource. The operations further include transmitting, upon detection of an activation of the control, a request to access the key, transmitting authentication information configured to establish whether the address associated with the first user is linked to the user account of the first user, and receiving a notification whether the key is available within the user account of the first user.

Implementations can include one or more of the following features. A determination may be made at the server as to whether the user account of the first user is authorized to provide the second user access to the key associated with the credential. Accessing the second user account based on the address of the user includes receiving authentication information from the second user for the second user account, and retrieving the second user account based on the authentication information. Accessing the second user account based on the address of the user further includes sending an invitation to the address of the second user to invite the second user to create the second user account. This can be done upon determining that the second user does not have a user account. A response to the invitation can be received and the second user account can be generated based on the response. The invitation can include a uniform resource locator (URL) that permits the second user to provide authentication information for generating the second user account. The address can be one of an e-mail address, a social network account address, a phone number, and an instant messaging account address. The request can include one or more constraints on the second user's access to the key. The one or more constraints can include at least one of a time, a location, and a presence of the first user.

An interface can include a directory which includes contact information associated with one or more other users. The directory can be accessed over a network, or stored locally on the client device. The directory can be associated with a social network account. Each address can include one of an e-mail address, a phone number, a social network account identifier, and an instant messaging account identifier. The operations can include receiving a notification that the second user has been invited to create a user account. A control can include a representation of a uniform resource locator (URL). The key can be displayed within the user account of the first user upon receiving notification that the key is available within the user account of the first user. An access request for the resource can be transmitted from within the user account of the first user based on the available key.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DESCRIPTION OF DRAWINGS

FIG. 1 is an illustration of an example of a user interface that enables a user to select from among various credentials.

FIG. 2 is an illustration of an example of a representation of a credential.

DETAILED DESCRIPTION

Figure 5:
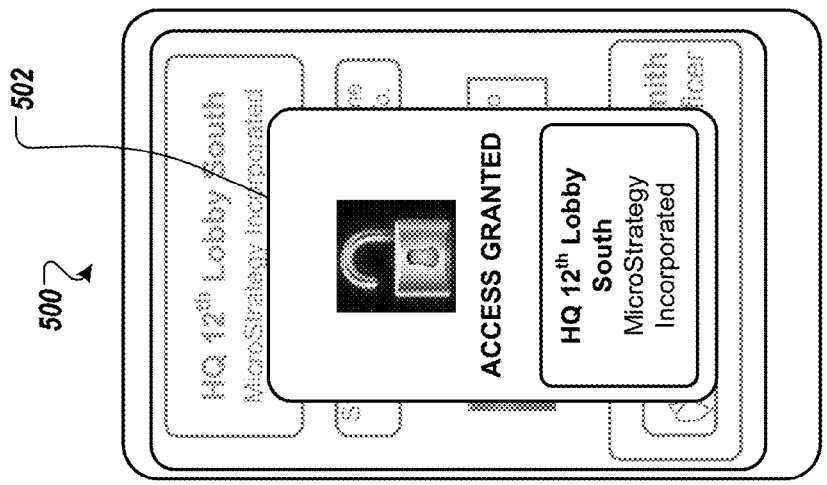
FIG. 5 is an illustration of an example user interface that provides notification of an access grant.

In some instances, representations of credentials for groups of users or for individuals are generated. The credentials can be, for example, badges reflecting membership in a group (e.g., employees of a company, graduates of a college, gym club memberships, etc.), identity credentials (driver's licenses, passports, visas, police badges etc.), health insurance cards, loyalty cards, badges to gain entrance to a location or event, a ticket for entry to a location or event, etc.

In some implementations, a credential can be associated with various electronic or virtual keys that can be used for accessing different resources. For example, a credential associated with employment with a company (e.g., an employee badge) can include or otherwise be associated with one or more virtual keys that can be used (for example on a mobile device) to electronically unlock doors within the physical premises of the company's office space. The virtual keys (also referred to herein as keys) may also be shared with other users. For example, an employee in possession of a virtual key to access a company gymnasium, can share the key with another user (e.g., a guest of the company), such that the user can also access the gymnasium using the shared key. Techniques described in this document allow a first user to share a virtual key with a second user over communication media such as e-mail, instant messaging or social network. For example, the first user may obtain a representation of the key (e.g., an alphanumeric code, or quick response (QR) code) and share it with the second user over e-mail or a social network such that the second user can input the representation on a client device to gain access to a corresponding resource. In some implementations, additional constraints can be imposed on the shared key. For example, the shared key can be configured to be valid only for a pre-determined period of time or can be configured to allow access to the corresponding resource only once.

When a credential issuing organization assigns a key to a user, a record can be created in the user's account within a credential management system, wherein the record indicates that the credential issuing organization has granted the user access to the key. When that user decides to share the key with another user, a share instance of the key can be created within the credential management system. After the key has been shared successfully with the intended recipient, another record can be created within the intended recipient's account, wherein the record links the intended recipient's account to the share instance. This allows the recipient to access to the corresponding resource (provided any relevant constraints associated with the share instance are satisfied) via a representation of the key that is linked to the share instance.

Credentials and associated keys can be maintained on and/or accessed from client devices (e.g., mobile computing devices like smart phones and tablet computers) and credentials can be represented in various forms. A server, or collection of servers, can manage and distribute credentials and keys to appropriate users' client devices. Users may operate the client devices to present representations of the credentials or keys for validation, and the representations may be validated using suitable mechanisms.

Examples of different representations for credentials and mechanisms for validating the different representations will now be described. In certain implementations, credentials can be represented by alphanumeric codes, optical machine-readable representations, sound signals, and/or near-field communication (NFC) signals.

A first form of representation for a credential is an alphanumeric code. As referred to herein, an alphanumeric code may be a sequence of numbers and/or letters (e.g., 4 to 24 characters) that is associated with a credential and a user. In some instances, a given alphanumeric code may be time-varying (e.g., will only be valid for a certain time period). To initialize an alphanumeric code, a server associates a given alphanumeric code with a credential, and distributes the alphanumeric code to the appropriate client device or devices.

To validate an alphanumeric code, a user presents the alphanumeric code to a validating device (e.g., a client device operated by a user or a processing system operated by a validating entity). The validating device may validate the alphanumeric code by transmitting a validation request message, which includes the alphanumeric code, to the server. When the server receives the validation request message, it attempts to confirm that the presented representation of the credential is valid. For example, the server may parse the alphanumeric code to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric code) with data associated with the retrieved credential.

Upon successful validation, the server sends the validating device a validation response indicating that the representation for the credential was valid (e.g., the presented alphanumeric code matches a valid alphanumeric code for the credential). In turn, the validating device may then provide an indication that the representation presented by the user or the third-party was valid.

Alternatively or in addition, a validating device may validate an alphanumeric code for a credential locally without requiring interaction with a server. For example, the representation for the credential provided by the third-party may be associated with a certificate associated with the third-party (e.g., a public key infrastructure (PKI) certificate), which may be stored locally at the validating device. The validating device may then compare information decoded from the alphanumeric code with information from the certificate to determine that the alphanumeric code is valid.

Another form of representation for a credential is an optical machine-readable representation. As referred to herein, an optical machine-readable representation of a credential may be an arrangement of graphical elements that encode alphanumeric data representing the credential, where the elements are arranged so that the data can be read by an optical scanner. For example, an optical machine-readable representation of a credential may be a bar code, a QR code, or an Aztec code, among other optical machine-readable representations. In some instances, a given optical machine-readable representation of a credential only may be valid for a certain time period. In some implementations, optical machine-readable representations of credentials may encode data including or representing credential identifiers and any other suitable data. In other implementations, optical machine-readable representations of credentials may encode other identifiers that are linked to or otherwise associated with credential identifiers.

To generate an optical machine-readable representation, a client device may use any suitable technique for encoding alphanumeric data within the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

To initiate the validation process for an optical machine-readable representation, a client device may output an optical machine-readable representation to a display of the client device. A validating device can scan the portion of the client device's display showing the representation of the credential and decode the representation of the credential to generate a set of alphanumeric characters that were encoded in the representation of the credential. In particular, the validating device may output a reticle defining a field of view from a camera operatively coupled to the validating device. This reticle can be used to scan the optical machine-readable representation of the credential from the relevant portion of the client device's display.

The validating device may use any suitable mechanism to scan and decode the optical machine-readable representation of the credential. For example, the validating device may access a function or library routine that captures and decodes QR codes and/or barcodes using a camera operatively coupled to the validating device. Suitable libraries may include, for example, RedLaser or Zxing.

In some implementations, the validating device may then validate the optical machine-readable representation of the credential by transmitting a validation request message to a server. The validation request message may include data corresponding to the alphanumeric characters that were encoded in the optical machine-readable representation of the credential. When the server receives the validation request message, it attempts to confirm that the presented representation of the credential is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the representation for the credential was valid (e.g., the alphanumeric characters in the request match a valid sequence of alphanumeric characters for the credential). In turn, the validating device may then provide an indication that the representation presented by the user or the third-party was valid.

Alternatively or in addition, a validating device may validate a set of alphanumeric characters from an optical machine-readable representation locally without requiring interaction with a server. For example, the optical machine-readable representation for the credential may include a certificate associated with the client device of the user or third-party presenting the optical machine-readable representation for validation. Alternatively or in addition, the representation for the credential may be associated with a certificate that is already stored locally at the validating device. The validating device may then compare information decoded from the optical machine-readable representation with information from the certificate to determine that the optical machine-readable representation is valid.

Yet another form of representation for a credential is a sound signal. As described herein, a sound signal is an oscillation of pressure waves transmitted through the air that are modulated to encode information. Any suitable modulation scheme could be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz.

A sound signal representing a credential may encode data including or representing a corresponding credential identifier and any other suitable data. In addition, a sound signal representing a credential may encode another identifier that is linked to or otherwise associated with a corresponding credential identifier. In some implementations, a given sound signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To generate a sound signal, a client device may use any suitable technique for encoding a representation of a credential. For example, the client device may call a function or library routine that encodes data into sound signals such as the Zoosh software development kit (SDK) by Naratte, Inc. The client device can then output the sound signal representation of the credential from a speaker coupled to the client device for reception by a validating device.

To initiate the validation process for a sound signal, a client device outputs a sound signal representing a credential. A validating device may then receive the sound signal at a speaker of the validating device and decode the sound signal representation of the credential to generate a set of alphanumeric characters that were encoded in the sound signal. The validating device may use any suitable mechanism to receive and decode the sound signal.

In some implementations, the validating device may then validate the sound signal by transmitting a validation request message to a server. The validation request message may include data corresponding to the alphanumeric characters that were encoded in the sound signal. When the server receives the validation request message, it attempts to confirm that the presented sound signal is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the sound signal was valid (e.g., the alphanumeric characters in the request match a valid sequence of alphanumeric characters for the credential). In turn, the validating device may then provide an indication that the representation presented by the user or the third-party was valid.

Alternatively or in addition, a validating device may validate a set of alphanumeric characters from a sound signal locally without requiring interaction with a server. For example, the sound signal may include a certificate associated with the client device of the user presenting the sound signal for validation. Alternatively or in addition, the representation for the credential may be associated with a certificate that is already stored locally at the validating device. The validating device may then compare information decoded from the sound signal with information from the certificate to determine that the sound signal is valid.

Still another form of representation for a credential is an NFC signal. NFC as described herein may refer to a set of standards (e.g., ECMA-340 and ISO/IEC 18092) for client devices to establish radio communication with each other by touching them together or bringing them into close proximity (e.g., typically no more than a few centimeters). NFC as described herein may also include other suitable short range wireless communication protocols such as Bluetooth or Zigbee.

A client device may use any suitable technique for encoding a representation of a credential within an NFC signal, such as a function or library routine. An NFC signal representing a credential may encode data including or representing a corresponding credential identifier and any other suitable data. In addition, an NFC signal representing a credential may encode another identifier that is linked to or otherwise associated with a corresponding credential identifier. In some implementations, a given NFC signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To initiate the validation process for an NFC signal, a client device transmits an NFC signal representing a credential. A validating device may then receive the signal at a receiver of the validating device and decode the NFC signal representing the credential to generate the set of alphanumeric characters encoded in the signal.

In some implementations, the validating device may then validate the NFC signal by transmitting a validation request message to a server. The validation request message may include data corresponding to the alphanumeric characters that were encoded in the NFC signal. When the server receives the validation request message, it attempts to confirm that the presented NFC signal is valid. For example, the server may parse and/or decode the alphanumeric characters to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric characters) with data associated with the retrieved credential.

Upon successful validation, the server sends the validating device a validation response indicating that the NFC signal was valid (e.g., the alphanumeric characters in the request match a valid sequence of alphanumeric characters for the credential). In turn, the validating device may then provide an indication that the representation presented by the user or the third-party was valid.

Alternatively or in addition, a validating device may validate a set of alphanumeric characters from an NFC signal locally without requiring interaction with a server. For example, the NFC signal may include a certificate associated with the client device of the user presenting the NFC signal for validation. Alternatively or in addition, the representation for the credential may be associated with a certificate that is already stored locally at the validating device. The validating device may then compare information decoded from the NFC signal with information from the certificate to determine that the NFC signal is valid.

FIG. 1 shows a sample user interface 100 that enables a user to select from among various credentials of the user. The interface 100 can be provided as a part of a credential management application that allows a user to create a user-account and manage credentials that may be associated with the user account. In some implementations, the various credentials may be issued by different organizations. In particular, the user interface 100 includes an example of a user's wallet (identified with a "User Wallet" caption 102) that provides the user with access to numerous different credentials associated with the user. For example, the user interface 100 includes a "Gym Membership Badge" 106 issued by Armstrong's Gym, a "MicroStrategy Employee Badge" 108, and a membership card 110, issued by Green Valley Country Club. In some implementations, the user-interface 100 can include account credentials 112 associated with a social network account. Examples of a social network can include Facebook®, Linkedin®, Google+®, and MySpace®. The user can select any one of these credentials from the user's wallet to output a representation of the credential from the user's client device. The user may make the selection, for example, by touching the corresponding area on a presence-sensitive display of the client device. The user can also select an Edit command button 104 to modify settings associated with the credentials, and can add a credential issued to the user, by a credential issuing organization, to the wallet by selecting command button 114.

FIG. 2 shows a sample representation of a credential. For example, when a user selects the "MicroStrategy Employee Badge" 108 shown in FIG. 1, assuming that any conditions associated with the credential (e.g., third-party authorizations) are satisfied, the selected badge 200 may be displayed on the client device as shown in FIG. 2. The badge 200 includes a caption 202 identifying it as an "Employee Badge" for "MicroStrategy Incorporated." Also included is an image of the user 204 and a caption 206 that identifies the associated user as "John Smith, Chief Operating Officer." In some implementations, the client device may obtain the user's image from, for example, a memory of the client device or a server. The badge 200 further includes a control such as a swiping slider 208 that may enable a user to select from among different representations for the credential. A representation for a credential may be a depiction or rendering corresponding to a credential that enables the credential to be validated. For example, in the current position, the slider 208 causes an optical-machine readable representation for the credential 210 (e.g., a quick response (QR) code) to be displayed. In other positions, the slider 208 may facilitate displaying other representations of the credential (e.g., an alphanumeric code, an acoustic code, or an NFC code) that may be used to have the credential validated.

When a credential issuing organization issues a credential to a user through the credential management application, it also may issue one or more keys to the user. The keys can be configured to provide access to one or more physical or virtual resources controlled by the credential issuing organization. For example, the keys issued by a company can be configured to provide employees access to various physical and/or virtual resources, such as a building lobby, a gymnasium, a library, one or more offices, an elevator, a lab, and/or a virtual private network (VPN). In some implementations, a predetermined set of keys can be associated with an issued credential. For example, when MicroStrategy issues an employee ID to a user, it also may issue a predetermined set of "keys" to the user, enabling the user to unlock various different doors within the MicroStrategy office building, gain access to certain floors of the MicroStrategy building from the building's elevators, and enter/exit the MicroStrategy parking garage. Keys may also be manually associated with a given credential. For example, a user with administrative rights associated with a key can distribute the key to another user. The keys can be tied into the access control systems that regulate access to the physical or virtual resources and enable the resources to be locked/unlocked or otherwise accessed by invocation of a control provided within the credential management application on the user's mobile device.

Figure 3:
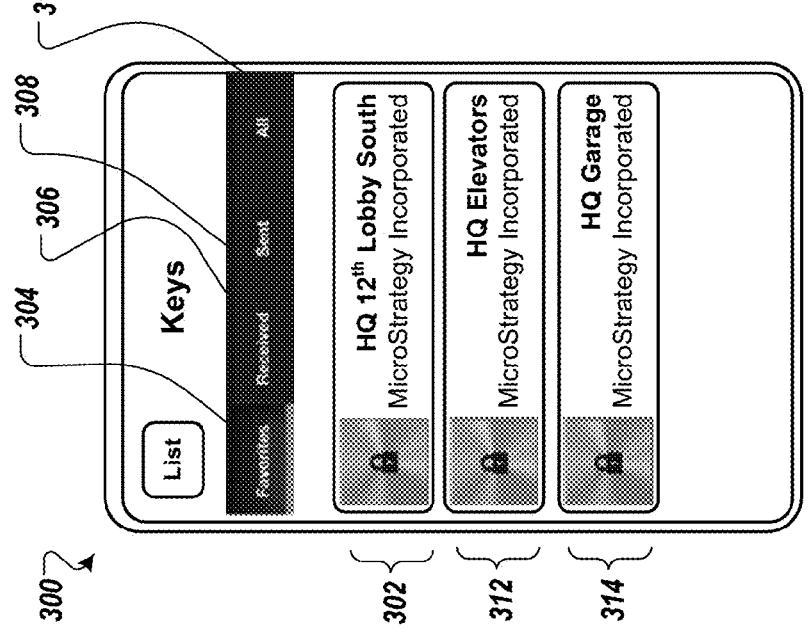
FIG. 3 is an illustration of an example of a user interface that enables a user to manage one or more keys associated with a credential.

FIG. 3 shows an illustration of an example of a user interface 300 that enables a user to manage one or more keys associated with a credential. The user interface 300 includes one or more keys (e.g., the key 302 that allows an access to the headquarter (HQ) $12^{th}$ Lobby South, the key 312 that allows access to the HQ elevators, and the key 314 that allows access to the HQ garage) associated with a particular credential. The user interface 300 can include various controls to customize the display of the keys. For example, the user interface can include a control 304 to display the favorite keys of the user, a control 306 to display keys received from other users, a control 308 to display keys the user has shared with other users and a control 310 to display all keys associated with the credential, or user account.

Figure 4:
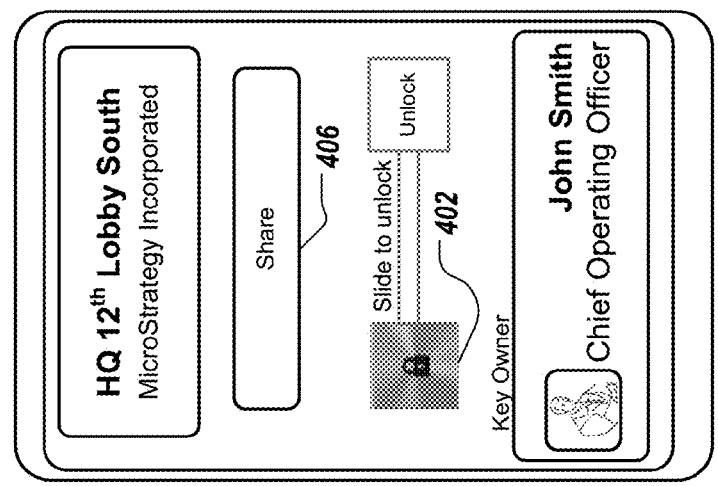
FIG. 4 is an illustration of an example user interface that enables a user to access a resource using a key.

FIG. 4 shows an illustration of an example user interface 400 that enables a user to access a resource using a key. The user interface 400 can be displayed when a user selects the key 302 shown in FIG. 3. A user can use the key 302 from the user interface 400 to access the resource associated with the key. In some implementations, the resource can be accessed by sliding the lock icon 402 to the right as shown in FIG. 4. When a user slides the lock icon 402 to the right, a request to access the corresponding resource can be transmitted to a server. A determination can then be made (e.g., at the server) as to whether the requesting user is authorized to access the resource, and the access can be granted accordingly. For example, permissions and authorizations to use keys or access resources for different users may be stored on the server and the server may make the determination based on the stored permissions and authorizations. In the example shown in FIG. 4, if a determination is made that the requesting user is authorized to access the HQ $12^{th}$ Lobby South, a door to the lobby can be unlocked in response to the access request, and a confirmatory display 502 can be displayed by a user interface 500 as shown in FIG. 5.

Referring again to FIG. 4, in some implementations, the user interface 400 can also include a control 406 that enables the user to share the selected "key" with another user by selecting the icon 406. Selecting the icon 406 can launch another interface that allows the user to share the selected "key" with one or more other users based on one or more contact information directories available to the user. For example, the user may be able to specify a contact address for an intended recipient (e.g., by entering an e-mail address, phone number, or social network account identifier), or select an intended recipient from a contact information repository. The contact information repository can include, for example, a local address book on the mobile device, a remotely hosted address book, an address book associated with a credential issuing organization from which the user has received a credential, and/or an address book maintained by a credential management system that provides the credential management application. After the user has specified a contact address for the intended recipient, the credential management system can determine if the specified contact address already has been registered with the credential management system as being associated with a particular account for the credential management system. In some implementations, the credential management system may require that each user account with the credential management system and/or each credential held by a user of the credential management system be associated with at least one e-mail address, phone number, and/or social network account, and the credential management system may determine if the specified contact address is associated with a user account and/or credential.

Figure 6A:
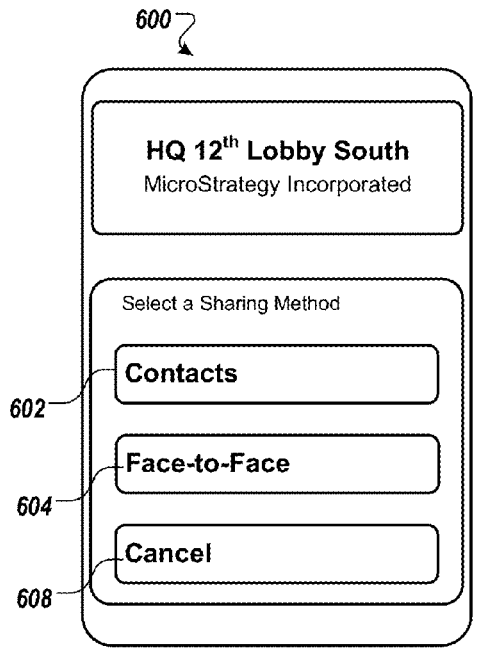
FIGS. 6A-6D are illustrations of example user interfaces that enable a user to share a key with another user.

FIGS. 6A-6D are illustrations of example user interfaces that enable a user to share a key with another user. In some implementations, the user interface 600 shown in FIG. 6A is presented when a user activates the control 406 (shown in FIG. 4) to share a key. The user interface 600 can combine multiple ways of selecting a recipient for the key. For example, the user interface 600 can include a control 602 that enables a user to access one or more directories of contacts. The user interface 600 can also include a control 604 that enables a user to share the key with a local user. The user interface 600 can also include a control 608 to cancel the key-sharing.

Figure 6B:
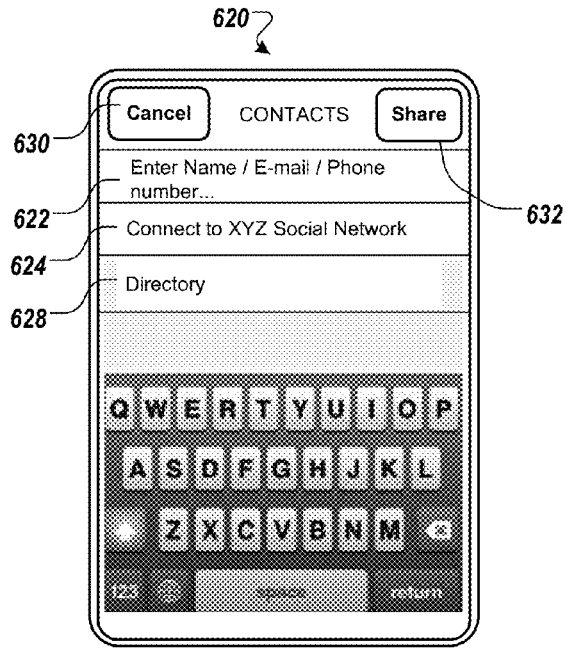

In some implementations, when a user activates the control 602, the user interface 620 shown in FIG. 6B can be provided to allow the user to specify a recipient from a list of contacts that may be acquired from one or more of multiple sources. For example, the user interface 620 may provide a unified interface for accessing contacts from a local phonebook, a corporate directory, and a social networking account. The user interface 620 can include a field 622 for manually entering a name, an e-mail address or a phone number (e.g., for SMS or MMS based key sharing) of a potential recipient. In some implementations, the user interface 620 can include a control 624 that allows the user to connect to a social networking account, such that the user's contacts list from the social network account can be accessed. The user interface 620 can also include a control 628 to access one or more other directories, including, for example, a local contacts list, a corporate directory, or a user-directory provided by the credential management system. The user interface 620 can also include a control 630 for canceling the key-sharing or going back to the previous user interface. The user interface 620 can also include a control 632 that enables the user to initiate sharing of the key when a recipient has been selected.

Figure 6C:
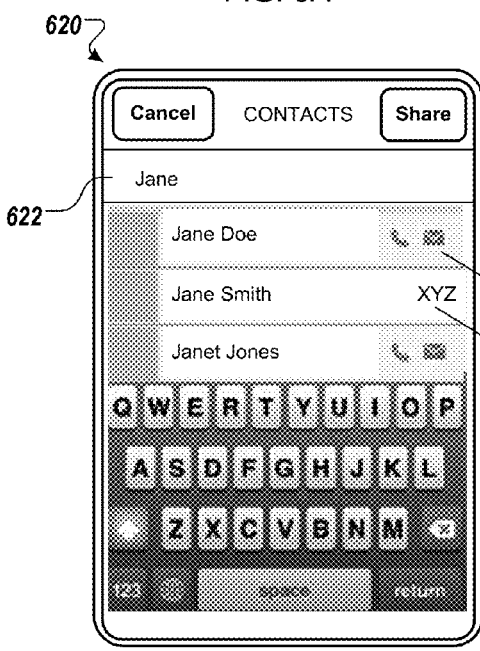

Referring now to FIG. 6C, in some implementations, when the field 622 is partially populated with a name or another identifier, a portion 634 of the user interface 620 is used to display one or more similar and/or matching entries that are available in the accessible directories. In the example shown in FIG. 6C, when the name "Jane" is manually entered in the field 622, the portion 634 of the user interface 620 displays the names "Jane Doe", "Jane Smith", and "Janet Jones" as similar and/or matching entries. In this example, at least a portion of each of the matching entries includes "Jane." However, the displayed entries can be chosen based on other similarity and/or matching criteria without deviating from the scope of this disclosure. In some implementations, each of the matching entries includes a representation (e.g., a graphical icon) indicating what kind of contact information is available for the entry. In the example of FIG. 6C, the icons 636 corresponding to the entry "Jane Doe" indicate that a phone number and an e-mail address is available for that entry. The icon 638 corresponding to the entry "Jane Smith" indicates that an account identifier corresponding to the XYZ social network is available for that entry.

Figure 6D:
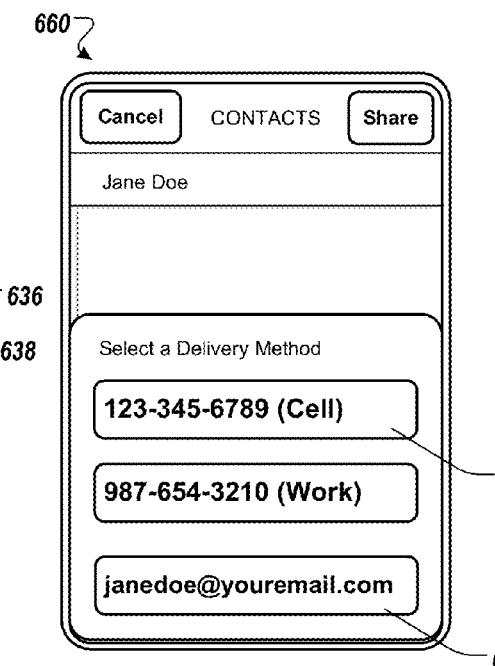

FIG. 6D shows an example user interface 660 that allows a user to select a particular method of communication when a recipient has been selected, provided multiple modes of communication are available for the selected recipient. For example, selecting "Jane Doe" as the recipient from the user interface 620 can cause a display of the user interface 660 that lists an e-mail address and two phone numbers associated with the recipient. One of the available options can be selected to initiate delivery of a key-sharing invitation to the particular address. For example, selecting the cellphone number 662 can cause a key-sharing invitation to be delivered to the recipient as an SMS or MMS. Similarly, selecting the e-mail address 664 can cause an invitation e-mail to be delivered accordingly. In some implementations, the list of options can also include a social network account identifier, selection of which causes the key-sharing invitation to be delivered within the corresponding social network account of the recipient.

In some implementations, once a recipient and a mode of delivery is selected, information about the recipient (name, destination address etc.) is transmitted to the credential management system. The credential management system can verify that the requester is indeed authorized to share the key with the recipient. For example, the credential management system may verify that the requester is either a key owner or has sufficient administrative privileges from the credential issuing organization who issued the key before allowing the requester to share the key. The credential management system can be configured to send a notification to the recipient based on the contact information provided by the requester. In some implementations, the notification can include an encrypted control identifying the address associated with the recipient. The notification can be sent, for example, in the form of an e-mail, a social network notification, an instant message, an SMS or an MMS depending on the contact information provided by the requester.

In some implementations, there may exist certain restrictions on the ability of a user to share a key with another user. For example, a user may share a key with an intended recipient only if the recipient possesses the credential with which the key is associated. For example, a MicroStrategy employee who receives a key as part of receiving the employee's MicroStrategy employee credential only may share the key with another user who also holds a MicroStrategy employee credential. In such cases, the credential management system may require that the contact address specified as the mechanism for sharing the key be associated with the credential required to receive the key. Additionally or alternatively, the credential management system may confirm that the user account with the credential management system with which the specified contact address is associated is also associated with the credential required to receive the key.

Figure 7B:
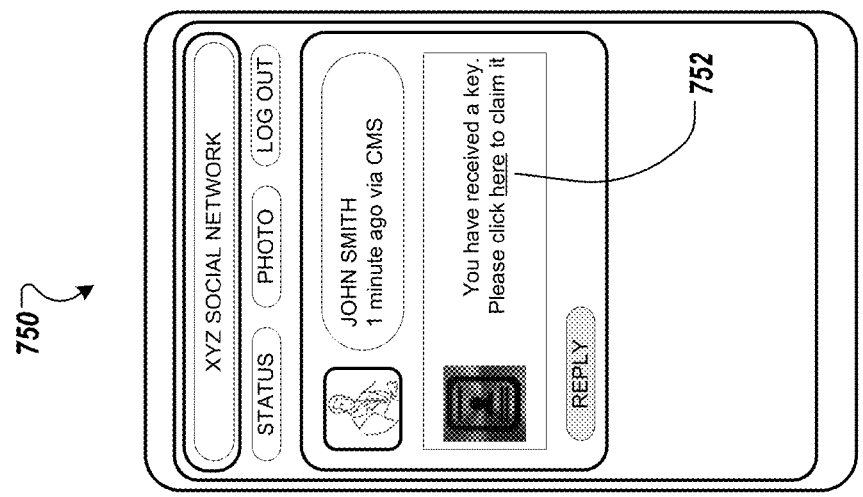
FIG. 7B is an illustration of an example user interface showing receipt of a key over a social network account.
Figure 7A:
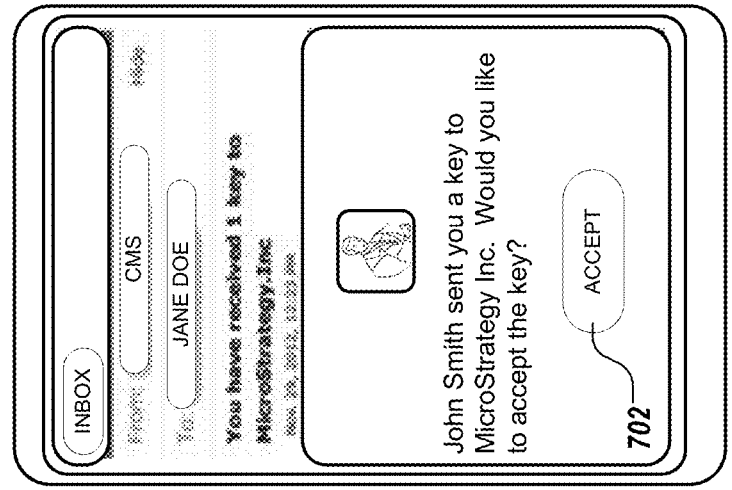
FIG. 7A is an illustration of an example user interface showing receipt of a key over e-mail.

FIG. 7A is an illustration of an example user interface 700 showing receipt of a key over e-mail. FIG. 7B is an illustration of an example user interface 750 showing receipt of a key over a social network account. An e-mail and a social network notification are illustrated in FIG. 7A and FIG. 7B, respectively, as example media for receiving the notification. In some implementations, the notification of receipt of a key can also be provided using, for example, an SMS, an MMS, an instant message, or another form of electronic communication. In some implementations, when a user wishes to send a key over a social network, a notification may be posted on the sender's page linking (e.g., via tagging) the recipient to the notification. The recipient may then receive a secondary notification indicating that the key can be accessed through the notification posted on the sender's page.

In some implementations, the notification can include, for example, information on the resource being shared by way of the key, information on the sender who is sharing the key, and/or the organization from which the key is being shared. The notification can also include a control for accepting the key or other resource being shared. For example, the control can include a selectable button 702 within an e-mail wherein the button is marked with "Accept", "View", or a similar phrase identifying the resource or key being shared. In another example, the control can include an URL (e.g., a hyperlink) 752 within a social network notification. In some implementations, activating the control from within the notification can initiate a workflow to determine whether or not the recipient is authorized to access the resource being shared. In some implementations, this can include launching an application (e.g., on a mobile client device), or opening a web-based location (e.g., within a browser) associated with the credential management system. When the shared resource is a document, the e-mail can also include a QR code associated with the document. In some implementations, scanning the QR code can cause a display of a document preview screen that may not allow a user to save or share the document. In some implementations information about the key being shared and/or the user with whom the key is being shared, can be encoded within the control 702 or the URL 752 (for example, via corresponding markup language used to generate the control 702 or URL 752, respectively), such that activation of the control 702 or the URL 752 causes the information to be transmitted to the credential management system.

Figure 8:
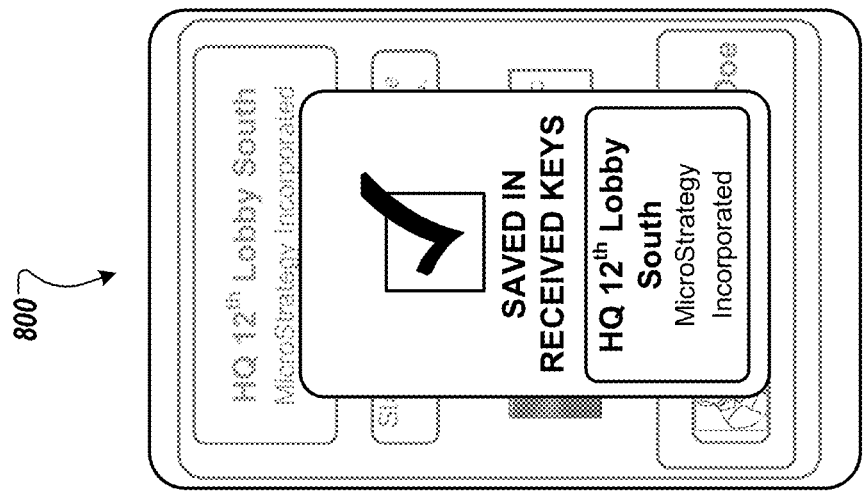
FIG. 8 is an illustration of an example user interface showing a notification that a received key has been saved within a user account.

In some implementations, activating the control 702 or 752 from within the notification triggers a request to access the shared key, and initiates a process for verifying that a source account associated with the request (e.g., the corresponding e-mail address, phone number, or instant message/social network account) is associated with an authorized user account within the credential management system. In some implementations, the credential management system may enforce a one-to-one relationship between a user account and a source account. For example, a particular e-mail address, social network account, or phone number may be validated with only one user account within the credential management system. In such cases, in order to successfully receive a key or another shared resource, the source account used to initiate the access request may need to be validated with a user account within the credential management system. If the source account from which the access request is initiated is determined by the credential management system to be associated with a user account of the recipient, the requested resource or key is saved within the user account. For example, if the request for a key is initiated from a source account registered or otherwise associated with a user account within the credential management system, and the recipient is already signed into the user account, a user interface 800 (as shown in the example of FIG. 8) can be displayed to notify the recipient that the key is saved within the user account. If, on the other hand, an access request is initiated from a source account that is not validated with a user account within the credential management system, the source account may have to be verified and/or linked to a user account within the credential management system before an access is granted.

Figure 9B:
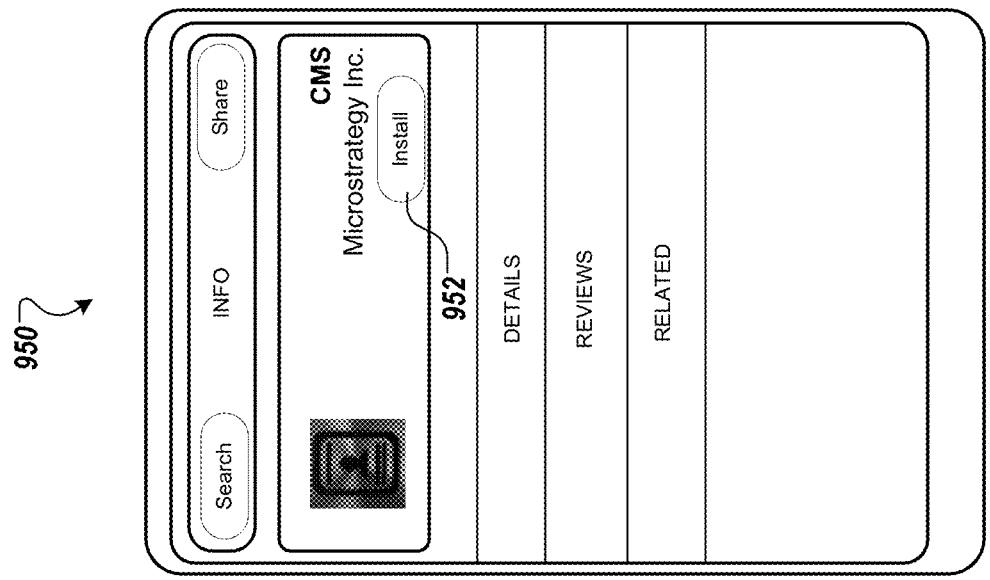
FIG. 9B is an illustration of an example user interface on a recipient device that enables a user to install an application for accessing a user account.
Figure 9A:
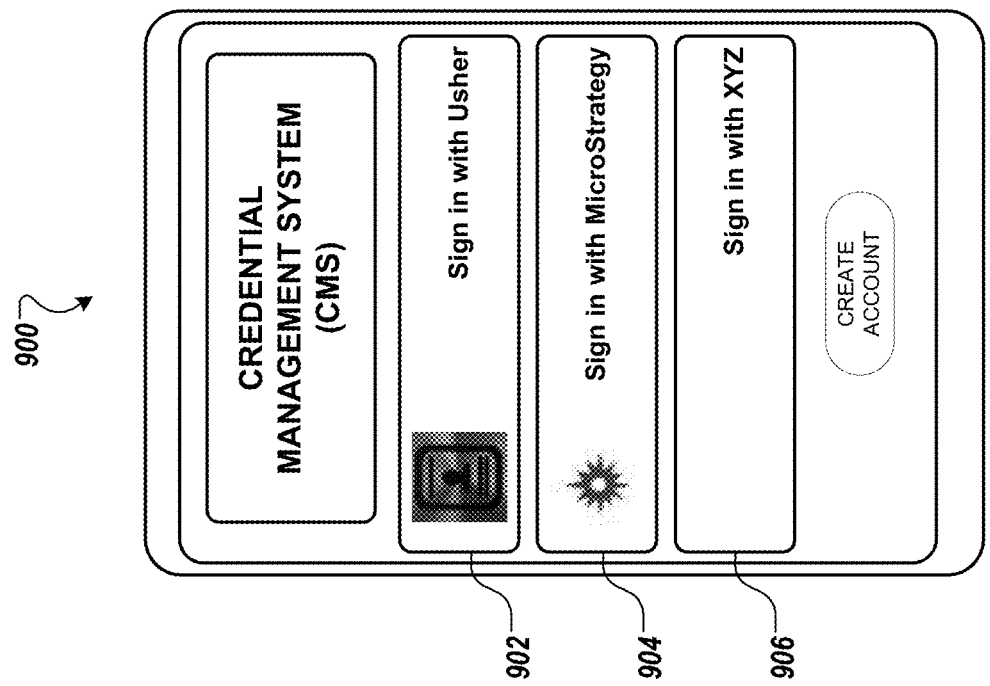
FIG. 9A is an illustration of an example user interface on a recipient device that enables a user to sign into a user account for accessing a received key.

In some implementations, the credential management system can ask a recipient to sign into a user account within the credential management system before the source account is verified and/or linked to the user account. FIG. 9A is an illustration of an example user interface 900 on a recipient device that enables a user to sign into a user account for accessing a received key. In some implementations, the user interface can enable a user to sign-in using one of several options. For example, the user interface 900 can include a control 902 that allows a user to sign-in using access credentials (such as a username-password pair) created with the credential management system. The user interface 900 can also include a control 904 that allows a user to sign into a user account within the credential management system using a corporate account that has already been linked to the credential management system. The user interface 900 can also include a control 906 that allows a user to sign into a user account within the credential management system using a social network or another third party account that has already been associated with the credential management system. The third party account or the corporate account is typically associated with a credential issuing organization that issues a credential to the user within the credential management system. In some implementations, the user interface 900 can also include a control 908 that allows a user to set up a user account within the credential management system.

In some implementations, the user interface 900 can be provided by an application executing on a client device. If the application is already installed on the client device, and the user is already signed into the user account, displaying the user interface 900 may be bypassed. If the client device does not have the application installed, a user interface 950 (as shown in FIG. 9B) can be displayed to allow the user to install the application. The user interface 950 can be provided from a server associated with the credential management system or from an application repository associated with a service provider independent of the credential management system. The user interface 950 can provide a control 952 that allows the user to download and install the application on the client device.

When a request to access a key or another resource is transmitted from a source account, the credential management system can be configured to identify the source account based on the access request. In some implementations, the notification includes a control (e.g., a button or URL) that is encrypted such that activation of the control identifies the source account to the credential management system. If the application is running on the client device from which the access request is transmitted, and a user is signed into a user account associated with the credential management system, the key can be made available within the user account upon determining that the source account is linked to the user account. If the source account is determined to be linked to a different user account, a message can be displayed that the requester is not authorized to access the key, and the requester can be prevented from accessing the key. For example, a user may open, e.g., by mistake, a first user account within the credential management system using an e-mail address, and a second user account using a social network identity. In such cases, because the social network identity may be tied to the e-mail address used for opening the first user account, the credential management system may determine that the same e-mail address is linked to two different user accounts. In such cases, unless the user agrees to merge the two accounts, the user may be prevented from accessing the key using an access request originating from the e-mail address.

Determining whether a source account is linked to a particular user account within the credential management system can include requesting a user to sign in to the source account and/or the credential management account. For example, if a key receipt notification is received within a social networking account, the application on the client device may request that the recipient provide access credentials related to the social networking account before allowing an access to the key. For example, to verify a Facebook® account, a user may be asked to either log into the credential management system through Facebook (for example using the control 906 described with reference to FIG. 9A) or connect to Facebook, for example, using a control similar to the control 624 described with reference to FIG. 6B. In some implementations, linking various social networking and/or e-mail accounts to the credential management system can be facilitated through an account management functionality provided by the application.

In some implementations, linking one communication account (e.g., a social networking account) with a user account within the credential management system can automatically result in other communication accounts (e.g., an e-mail account) being linked to the user account. For example, when a recipient's Facebook account is verified or linked to the user account within the credential management system, a primary email address linked to the Facebook account can be automatically verified or linked. If the same primary email address is already verified with another user account within the credential management system, the user may be prompted to merge the two user accounts. In some implementations, a user may be barred from accessing two different user accounts using the same e-mail address and/or social networking account.

In some implementations, if a user attempts to access a key or another resource through a social networking or e-mail account that has not yet been verified or linked to the credential management account, a verification opportunity can be provided to the user. For example, when attempting to access a key from an unverified e-mail account, the user can be prompted to enter a validation code (or another form of authentication) such that the e-mail account can be verified and linked to the user account within the credential management system. FIG. 10A is an illustration of an example user interface 1000 enabling a user to input a verification code. The user interface 1000 can include, for example, a field 1002 for displaying the verification code input by the user, and an input portion 1004 for receiving the verification code from the user. The input portion 1004 can include a numeric or alphanumeric keyboard depending on the nature of the expected verification code. The user interface 1000 can also include a portion 1006 displaying where the verification code may be found. In the example of FIG. 10A, the portion 1006 displays that the verification code has been sent to an e-mail address of the user.

Figure 10B:
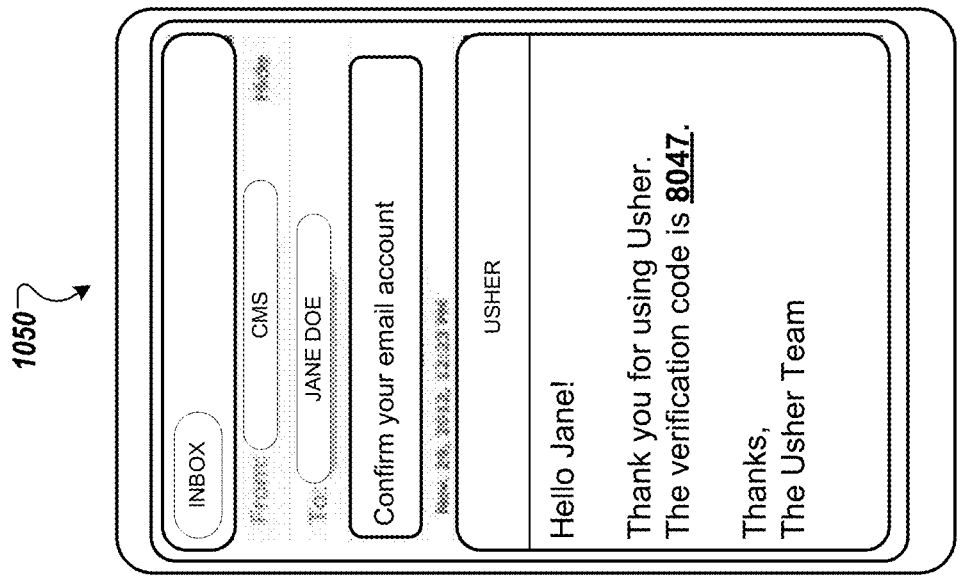
FIG. 10B is an illustration of an example user interface showing the receipt of a verification code associated with accessing a key.
Figure 10A:
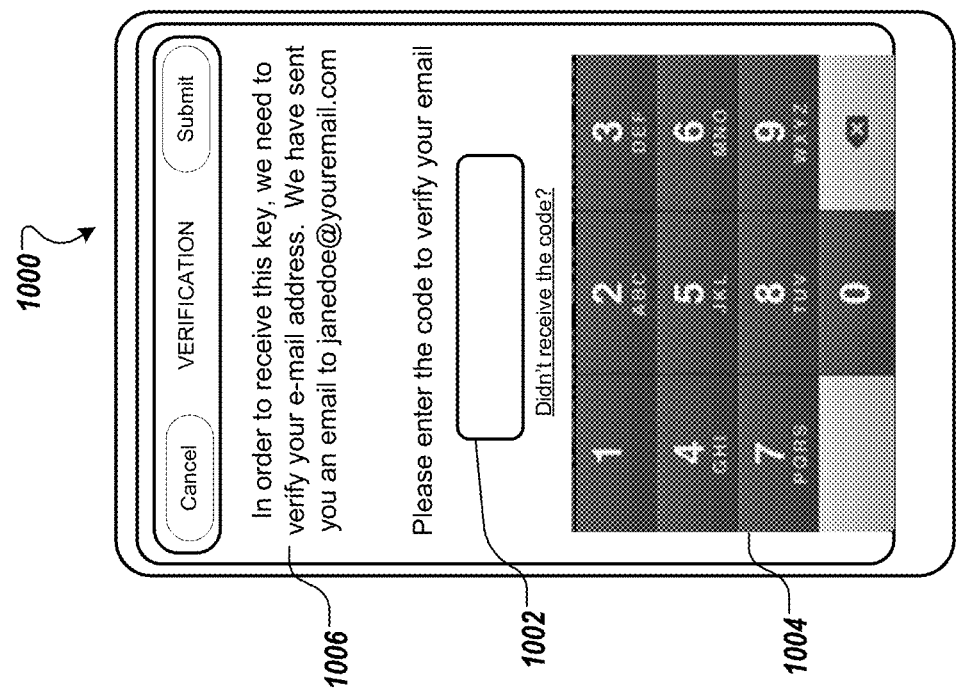
FIG. 10A is an illustration of an example user interface enabling a user to input a verification code associated with accessing a key.

FIG. 10B is an illustration of an example user interface 1050 showing the receipt of a verification code associated with accessing a key. Though the user interface 1050 illustrates receipt of the verification code over an e-mail, the verification code can also be received via other communication accounts including, for example, a social networking account, an SMS, an MMS, or an instant message.

Figure 11C:
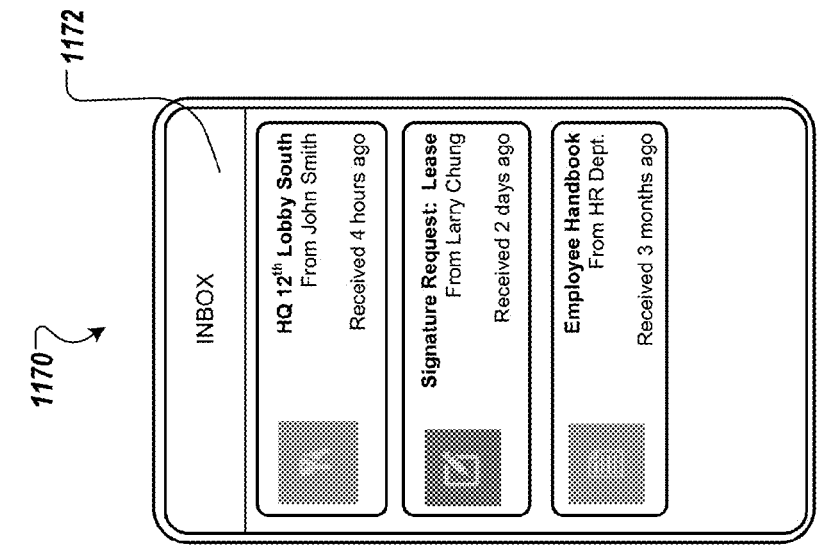
FIG. 11C is an illustration of an example user interface showing a list of received items within a user account.
Figure 11B:
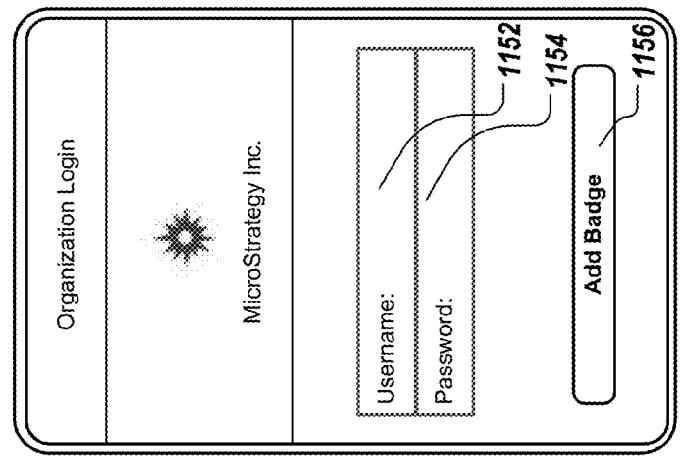
FIGS. 11A-11B are illustrations of example user interfaces associated with a secondary authentication requirement for accessing a key.
Figure 11A:
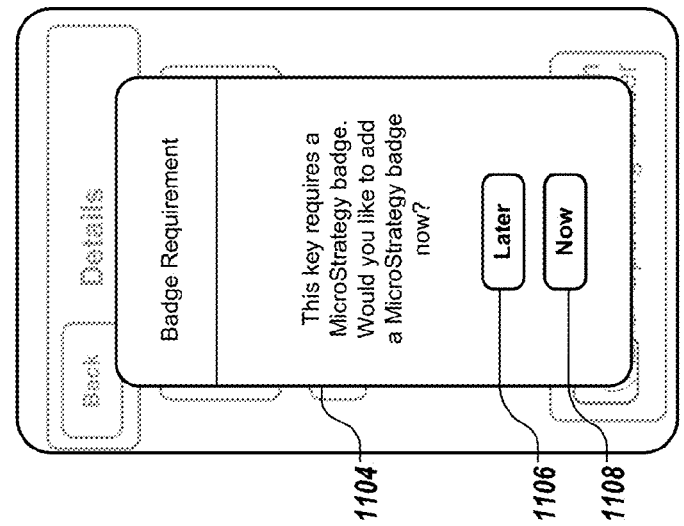

In some implementations, accessing a received key or document may require one or more forms of secondary authentication. For example, if a key is related to accessing a resource within a company, accessing such a key may require possession of a company badge such as the badge 108 described with reference to FIG. 1. In such cases, if a recipient's badge is already added or linked to the recipient's user account within the credential management system, the recipient is automatically provided access to the key. On the other hand, if the recipient's badge is not linked to the recipient's user account 1170 within the credential management system, a user interface 1100 (as shown in FIG. 11A) displaying a badge requirement 1104 may be displayed.

The badge requirement 1104 can be configured to include a control 1108 to allow the recipient to include the badge information immediately. Activating the control 1108 may cause the display of a user interface 1150 (as shown in the example of FIG. 11B) that allows the recipient to add the badge. The badge can be added, for example, by providing a username in the field 1152, a password in the field 1154, and activating the control 1156. Upon activation of the control 1156 and successful authentication of the provided authentication information, the badge may be added to the user's user account and the received key can be stored in an inbox 1172 displayed in the example user interface 1170 of FIG. 11C. Alternatively, the received key can be displayed within a user interface such as the interface 300 described with reference to FIG. 3. When a key is saved within a user's account, a record can be created within the credential management system, the record indicating that the key is linked to the corresponding user account, and that the user has access to the corresponding resource.

In some implementations, activation of the control 1156 initiates an authentication of the user with the badge issuing organization. Once the user is authenticated with the badge issuing organization (MicroStrategy in the current example), the organization can communicate to the credential management system that the user is authorized to hold the badge. The badge can then be added or linked to the user account within the credential management system. The badge requirement may also include a control 1106 that allows the recipient to choose to add the badge information at a later time.

Figure 12:
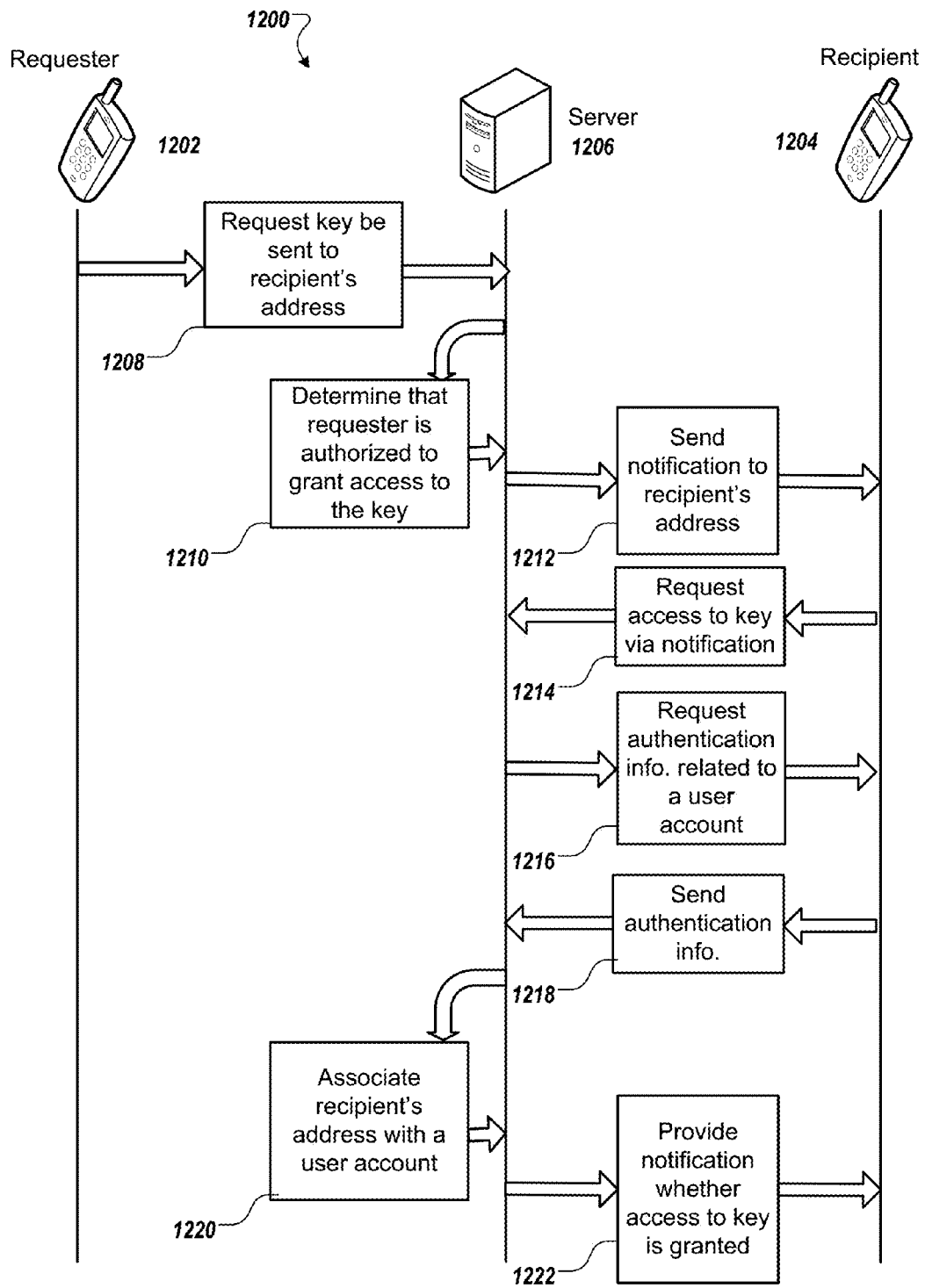
FIG. 12 is a schematic diagram representing examples of communications between a requester device, a recipient device, and a server.

FIG. 12 shows an example system 1200 for management, distribution, and validation of keys and/or credentials. As an overview, a requester using a client device 1202 transmits a request 1208 to a server 1206 that a key to which the requester has access be sent to a recipient's address. The address information of the recipient can include one of an e-mail address, a phone number, a social network account identifier, or instant messaging account identifier, among other types of address information. The request can also include one or more conditions on the nature of access to be provided to the recipient by way of the key. For example, the requester can specify a time duration for which the recipient may be able to access the resource associated with the key. Upon receiving the request 1208, the server 1206 can make a determination 1210 that the requester is authorized to share the key with the intended recipient. This can include, for example, checking if the requester is the owner of the key and/or has sufficient administrative privileges, from the credential issuing organization associated with the key, to share the key. For example, the server 1206 may determine whether a credential associated with the requester allows the user to share a particular key with other users. Conversely, if the server 1206 determines that the requester is trying to share a key that has been shared with the requester by another user, the server can be configured to prevent the requester from sharing the key.

In operation, the server 1206 manages and/or stores one or more credentials, associates users, groups of users, and keys with appropriate credentials, and provides the credentials and keys to users' client devices to allow the users to access various physical and virtual resources. The server 1206 can be any suitable computer or collection of computers executing software capable of managing, distributing, and/or validating representations of credentials and keys for users and groups of users via a network as described herein.

Credentials, user accounts, group accounts, and administrative accounts can be stored in a database (e.g., MySQL, PostgreSQL, MS SQL Server, MongoDB), or other suitable data structure that can be accessed by the server 1206. In some implementations, the server 1206 may access the stored credentials, keys and/or user accounts via web services such as representational state transfer (REST) style services. User accounts may be stored in a table or collection of tables in a database, or in any other suitable data structure accessible by the server 1206. The user accounts may include a variety of information such as user name, user title, user identifier (e.g., a number or character string that uniquely identifies a user), one or more unique keys for the user (e.g., alphanumeric codes that can be used for encryption and/or decryption), and/or the address(es) of one or more accounts and client devices owned by or otherwise associated with the user. User accounts can be created at the request of potential users through a web-based or other interface. In some implementations, the potential users may be able to create user accounts by use of an application running on a client device.

The server 1206 can then send a notification 1212 (e.g., one including a URL for accessing the key) to the recipient's address. The recipient may access the notification 1212 using a client device 1204. The recipient can use the client device 1204 to transmit a request 1214 to access the key, by clicking one or more controls provided within the notification 1212. The request 1214 can include information identifying the recipient's address from which the request 1214 originates. In some implementations information about the key being shared and/or the user with whom the key is being shared, can be encoded as parts of the controls provided within the notification 1212 (for example, via corresponding markup language used to generate the controls), such that activation of the controls causes the information to be transmitted to the credential management system.

Upon receiving the request 1214, the server 1206 can determine if the recipient's address is associated with a user account within a credential management system. This can include, for example, sending a request 1216 for authentication information related to the recipient's user account within the credential management system. In response, the recipient may send the requested authentication information 1218 to the server 1206. In some implementations, the recipient may authenticate himself/herself with a credential issuing organization. In such cases, once the user is authenticated with the credential issuing organization, the organization can communicate to the credential management system that the recipient's user account can be validated. In some implementations, if the server 1206 determines that the recipient is already signed into a user account within the credential management system, the exchange of the request 1216 and the authentication information 1218 may be bypassed. The server 1206 can perform an association or linking 1220 of the recipient's address with the recipient's user account. This can be done, for example, substantially as described above with reference to FIGS. 7A-11C. Based on an outcome of the association 1220, the server 1206 provides a notification 1222 to the recipient as to whether access to the key has been granted.

The server 1206 may present one or more suitable interfaces for sharing, validating and accessing of keys. For example, the server 1206 may present the user interfaces described above with reference to FIGS. 1-11C. In some implementations, the server 1206 may be directly accessible via a graphical-user interface or an application running on a mobile device such as the client devices 1202 and 1204.

The client devices may communicate with the server 1206 over a network. For example, the network may be a local area network ("LAN") and/or a wide area network ("WAN"), e.g., the Internet. In some versions, the server 1206 may communicate with the client devices via hypertext transfer protocol (HTTP), SMS or multimedia messaging service (MMS) or any other suitable network communications protocol. The server 1206 may access user accounts in a database to locate the appropriate users' client devices and addresses.

The client devices 1202, 1204 may be any type of computing device, including but not limited to a mobile phone, smart phone, personal digital assistant (PDA), music player, e-book reader, tablet computer, laptop or desktop computer, or other stationary or portable device, that includes one or more processors and non-transitory computer readable storage media. The application that is installed on the client devices can be written in any suitable programming language such as, for example, Objective-C, C++, Java, etc.

Figure 13:
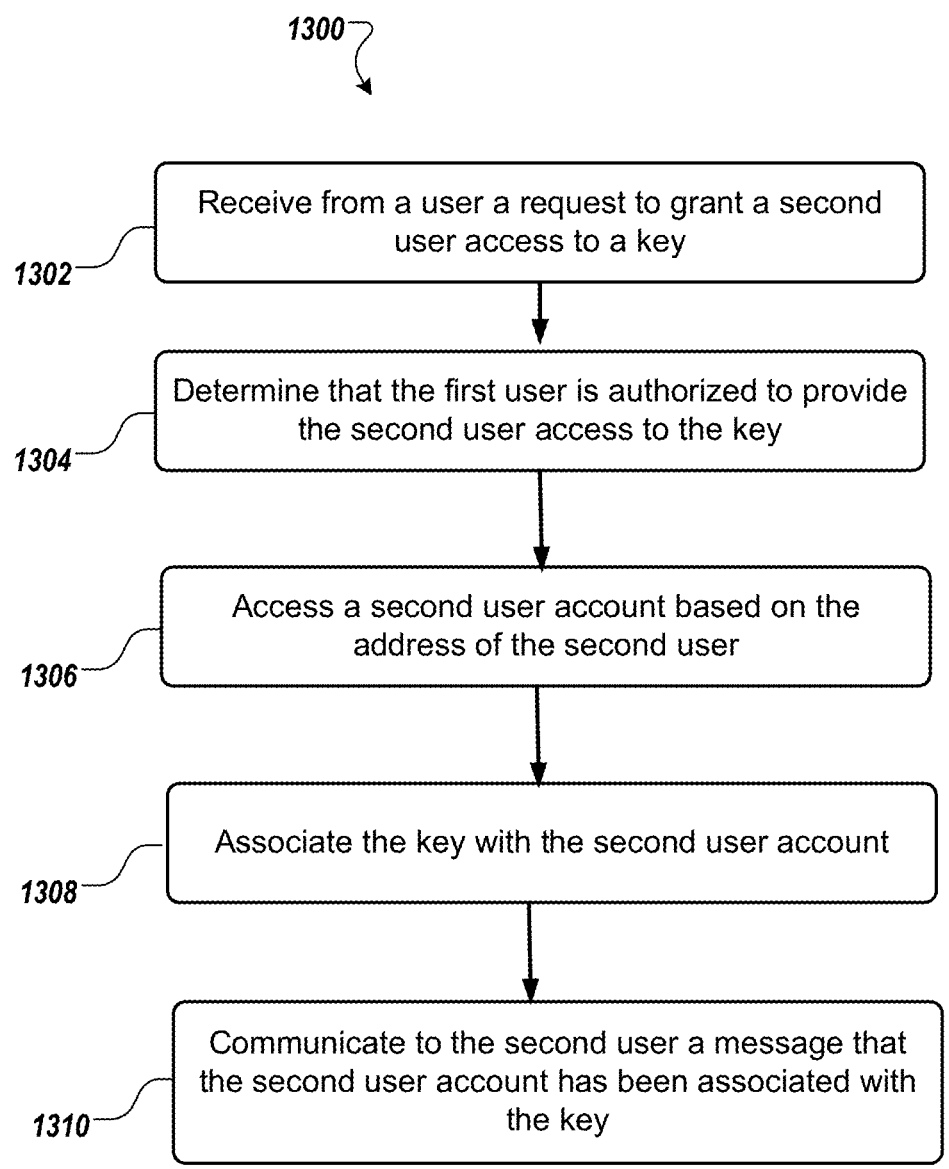
FIG. 13 is a flowchart of an example process for sharing a key between two users.

FIG. 13 shows an example process 1300 that facilitates sharing a key between two users. The operations of the process 1300 may be performed, for example, by the server 1206 of FIG. 12. Operations include receiving from a first user a request to grant a second user access to a key (1302). The request can be received at the server 1206 from a client device 1202 associated with the first user. The key can be associated with a credential that is linked to or associated with a user account of the first user. The user account can be related to a credential management system, and the key can be configured to permit access to a physical or virtual resource. For example, activation of the key may unlock an electronic lock thereby allowing a user to open a door. The request may include an address of the second user. The address can include, for example, an e-mail address, a social network account address, a phone number, and an instant messaging account address. The request can also include one or more constraints (e.g., temporal constraints) on the second user's access to the key.

Operations can optionally include determining that the first user is authorized to provide the second user access to the key (1304). This can include, for example, determining the administrative privileges of the first user with respect to the key being shared. For example, a company may allow only the executives and security officers to share keys. In such cases, determining the administrative privileges of the first user can include accessing a credential of first user to determine whether the first user is an executive or a security officer.

Operations also include accessing a second user account based on the address of the second user (1306). The second user account can be within the same credential management system that the first user account pertains to. Accessing the second user account can include, for example, receiving authentication information from the second user for the second user account, and retrieving the second user account based on the authentication information. In some implementations, it may be determined that the second user does not have a user account. In such cases, accessing the second user account can also include sending an invitation to the address of the second user to invite the second user to create the second user account. The second user account can then be created based on a response of the second user to the invitation. In some implementations, the invitation can include a uniform resource locator (URL) that permits the second user to provide authentication information for generating the second user account.

Operations also include associating the key with the second user account (1308). This can enable the second user to use the key from within the second user account to access the resource associated with the key. In some implementations, associating the key with the second user account includes determining that the address of the second user is associated with or linked to the second user account. Operations can also include communicating to the second user a message that the second user account has been associated with the key (1310). In some implementations, this can include transmitting a notification that the key has been saved within the second user account and available to the second user.

Figure 14:
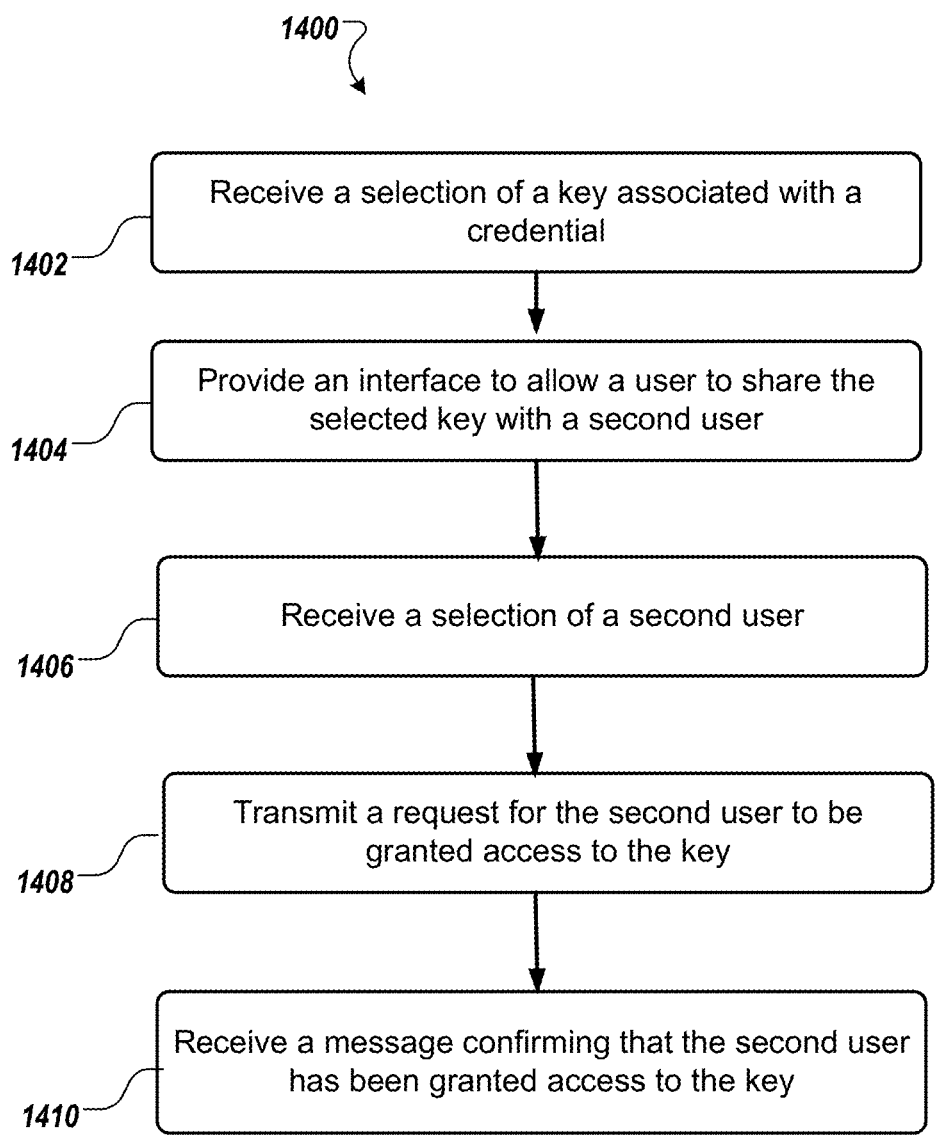
FIG. 14 is a flowchart of an example process that allows a user of a client device to share a key with another user.

FIG. 14 shows an example process 1400 that allows a user of a client device to share a key with another user. The operations of the process 1400 may be performed, for example, at the client device 1202 of FIG. 12. Operations of the process 1400 include receiving at the client device a selection of a key associated with a credential (1402). The credential is associated with a user account of the first user. The selection of the key can be received through a user interface provided by a credential management application executing on the client device 1202.

Operations also include providing an interface to allow a user to share the selected key with a second user (1404). The interface can include an address associated with one or more other users. The addresses can be retrieved from one or more directories accessible from the client device 1202. For example, the addresses can include contact information retrieved from multiple sources, including, for example, a local directory, a remote directory accessed over a network, a corporate directory, and a list of social network contacts.

Operations further include receiving a selection of a second user from the one or more other users presented through the user interface (1406). This can also include receiving an address (e.g., an e-mail address, a phone number, a social network account identifier, or an instant messaging account) for communicating with the second user. In some implementations, more than one user can be selected such that a key can be shared with multiple recipients. Details related to the key sharing (e.g., recipient names, constraints included, time of sharing etc.) may be saved within the user account of the first user.

Operations also include transmitting a request for the second user to be granted access to the key (1408). The request can include identification of the address of the second user. In some implementations, the transmitted request can include identification of one or more constraints on the second user's access of the key. Operations can also include receiving a message confirming that the second user has been granted access to the key (1410). In some implementations, the operations can also include receiving a notification that the second user has been invited to create a user account.

Figure 15:
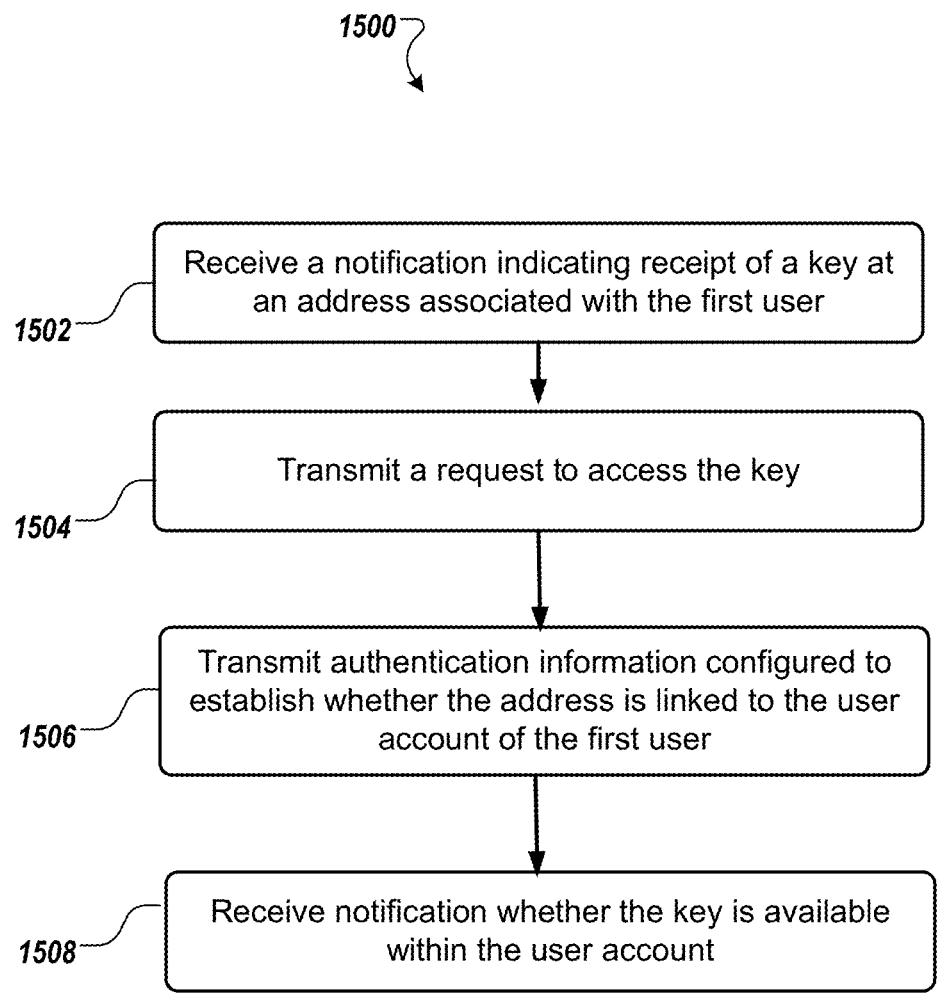
FIG. 15 is a flowchart of an example process that allows a user of a client device to access a key received from another user.

FIG. 15 shows an example process 1500 that allows a user of a client device to access a key received from another user. The operations of the process 1500 may be performed, for example, at the client device 1204 of FIG. 12. Operations include receiving a notification indicating receipt of a key at an address associated with a first user (1502). The notification can be received over e-mail, a social networking platform, instant message, SMS, or MMS. The key can be associated with a credential of a second user that initiates the key sharing. In some implementations, the notification can include a control that allows an initiation of access to the key.

Operations include transmitting a request to access the key (1504). The request can be transmitted based on detecting an activation of the control provided within the notification. In some implementations, the control can include, for example, a URL encrypted such that interacting with the URL transmits an access request that includes an identification of the communication account from which the request originates.

Operations also include transmitting authentication information configured to establish whether the address is linked to the user account of the first user (1506). In some implementations the authentication information can be received from the first user through a user interface provided by a credential management application executing on the client device 1204. In some implementations, the authentication information may be stored (e.g., in a cache) and transmitted when the credential management application is invoked. The authentication information can include authentication information related to a third party site or application (e.g., a social network platform) that can be used for signing in to credential management system. Operations also include receiving notification whether the key is available within the user account (1508).

Figure 16:
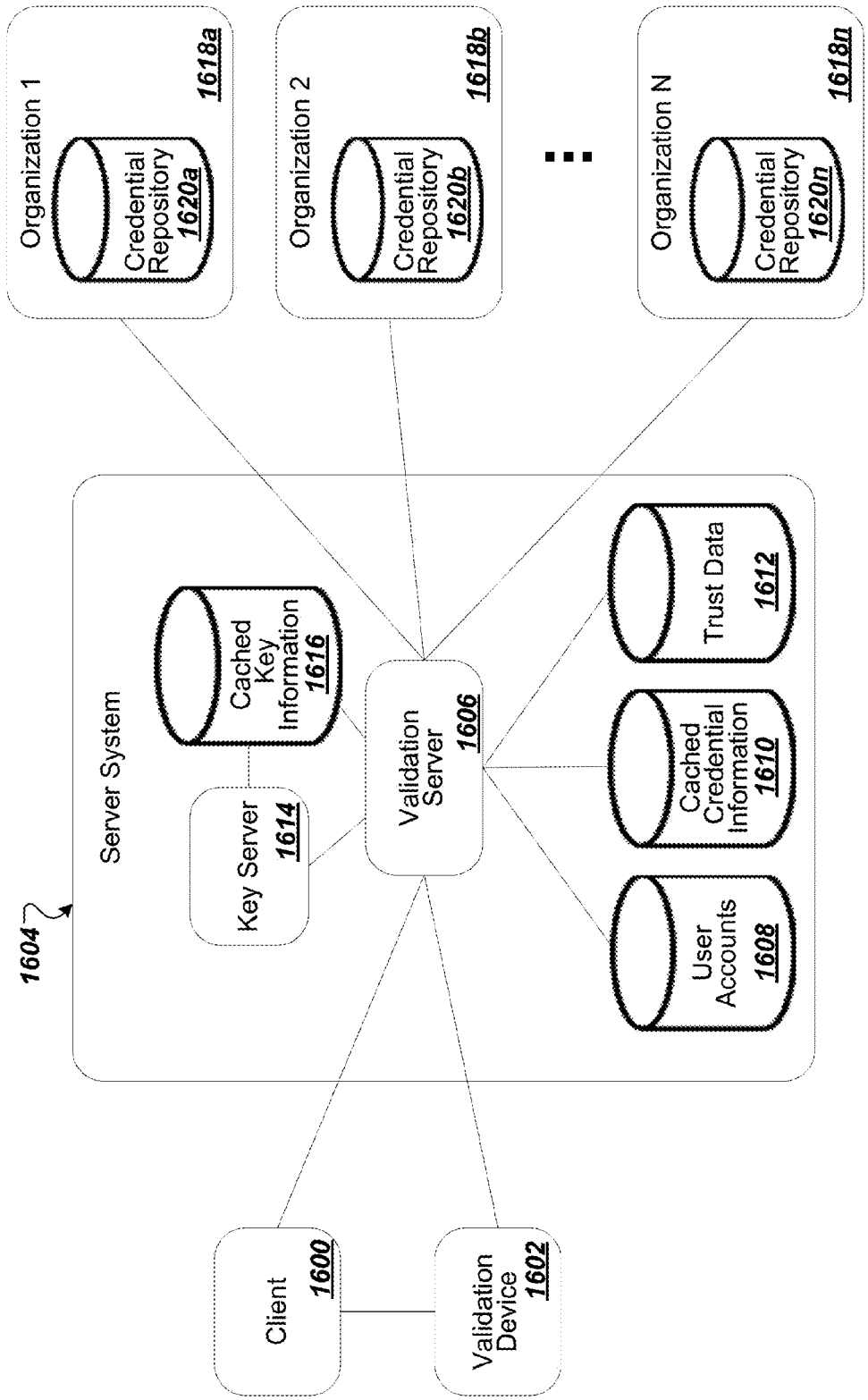
FIG. 16 illustrates an example of a credential management system.

Referring now to FIG. 16, an example of a credential management system is illustrated. In this example, the system includes a client device 1600, a validation device 1602, and a server system 1604. The client device 1600 can operate, for example, a mobile device-based credential management application. The validation device 1602 may be any device that, for illustrative and exemplary purposes, is used to validate a credential and/or key of a user of client device 1600. The client device 1600 may include any electronic device that is capable of communicating with the server system 1604 including, but not limited to, a mobile phone, smart phone, personal digital assistant (PDA), electronic book (e-book) reader, tablet computer, laptop, or other device that includes one or more processors and non-transitory computer readable storage media. The credential management application that is installed on the client device 1600 is in communication with the server system 1604. The credential management application acts as a platform for managing credentials and related resources (e.g., keys) issued to multiple, different users by various credential-issuing organizations. The server system 1604 can be substantially similar to the server 1206 described with reference to FIG. 12.

The server system 1604 can include a validation server 1606, a user account data store 1608, a credential data store 1610, a trust data store 1612, and a key data store 1616. The validation server 1606 can be involved in the process of validating credential issuing organizations as well as validation of credentials and/or keys. The validation server 1606 authenticates credential issuing organizations that would like to make credentials and/or keys available to users of the credential management application. The validation server 1606 also validates credentials and/or keys held by users of the credential management system through communication with credential management applications operated on user devices, such as client device 1600.

The user account data store 1608 stores user account information, the credential data store 1610 stores credential information associated with user accounts, the trust data store 1612 stores trust rules provided by credential-issuing organizations and/or restrictions specified by the user to govern the provisioning of credentials and/or keys on the mobile device 1600, and the key data store 1616 stores keys associated with the credentials. Users of the credential management application may set up a user account that allows the user to store personal information as well as the credentials and related resources (e.g., keys) issued to the user. Each user account may include identification information for the user and credential/key data that defines credentials and/or keys held by the user. The server system 1604 may maintain accounts for multiple different users with each user account specific to a user, as well as maintain the credentials and/or keys held by the specific user.

The validation server 1606 is in communication with the user account data store 1608, the credential data store 1610, the trust data store 1612, and the key data store 1616, for example, to manage and validate credentials and related resources (e.g., keys). The validation server 1606 authenticates and establishes connections with various trusted credential-issuing organizations, such as Organization 1, Organization 2, . . . , Organization N that operate systems 1618*a*, 1618*b*, . . . , 1618*n*, respectively, as shown in FIG. 16. The number of credential-issuing organizations 'n' can be any suitable positive integer. The server system 1604 may use a variety of information and techniques to communicate with the credential issuing organization systems 1618a-1618n. For instance, the server system 1604 may use an electronic address (e.g., a uniform resource locator (URL)) to communicate with the credential issuing organizations 1618a-1618n and a set of guidelines that govern a format for exchanging communications between the credential issuing organization systems 1618a-1618n and the server system 1604.

As shown in FIG. 16, the validation server 1606 establishes multiple, different connections with multiple, different credential issuing organization systems 1618a-1618n. The credential-issuing organizations may include one or more universities, one or more companies, and one or more government agencies, among other organizations. One or more of the credential issuing organization systems 1618a-1618n may maintain a credential repository (e.g., credential repositories 1620a-1620n on systems 1618a-1618n, respectively).

A user may log-in to the credential management application using authentication information for one of the n credential-issuing organizations, for example, by using authentication information for Organization 1. In some implementations, the server system 1604 may receive the authentication information and determine that the user has been authorized by Organization 1, for example, by determining that the user's authentication information has been validated by Organization 1. As a result of determining that the user has been authorized by Organization 1, the server system 1604 may enable the user to use one or more credentials and/or keys issued by Organization 1. In addition, as a result of determining that the user has been authorized by Organization 1, the server system 1604 may enable the user to use one or more credentials and/or keys issued by other credential-issuing organizations, such as Organization 2.

For example, the client device 1600 may attempt to use credentials and/or related resources (e.g., keys) from the credential issuing organization system 1618b, operated by Organization 2. The validation server 1606 sends a request to the credential-issuing organization system 1618b for credential information of a user of the client device 1600. The credential-issuing organization system 1618b accesses data from the credential repository 1620b and provides credential information from the accessed data to the validation server 1606. In some implementations, a credential-issuing organization system 1618b may transmit the credential information to the server system 1604 in a specific format specified by the server system 1604. For example, the credential-issuing organization system 1618b may transmit the credential information to the server system 1604 as a JavaScript Object Notation (JSON) object. Additionally or alternatively, the credential information may have certain fields to be filled by the credential-issuing organization system 1618b as specified by the server system 1604. The fields may include group name, user name, title of credential or badge title, expiration date, cache until date, and an extra field. The credential information also may include additional information. Such additional information may be communicated as encryption key-value pairs or it may be communicated as binary data or any other suitable data format. Additional information may include a photo of the user, or the logo of the credential-issuing organization.

After receiving the credential information from the credential-issuing organization system 1618b, the server system 1604 may add one or more credentials and/or related resources (e.g., keys) to the user's account based on the received credential information. For example, the server system 1604 may identify an account associated with the user and associate, with the account, one or more credentials and/or keys defined by the credential information. In this example, the server system 1604 may store the credential information in association with the account of the user or the server system 1604 and may store other information representing the one or more credentials or keys defined by the credential information.

The validation server 1606 may have accessed, at any suitable time, the trust data store 1612 to determine that the user should be enabled to use the credential and/or key from Organization 2, based on trust rules established by Organization 2 and/or by a user of the client device 1600. The trust data may indicate that Organization 2 trusts the authorization of the user by Organization 1, and is willing to make one or more of its credentials and/or keys accessible to the user as a result of the user being authorized by Organization 1. Based on the accessed trust data, the validation server 1606 provides credential information for Organization 2 to the client device 1600 for display through the credential management application to the user.

In some examples, after a credential and/or key is added to a user's account, the server system 1604 may sign the added credential and/or key and pass the added credential and/or key to the user device, where the added credential and/or key is displayed by the mobile credential management application with the list of credentials and/or keys associated with the account of the user. In these examples, some or all of the credential information for each of the credentials and/or keys associated with the account of the user is stored at the client device by the mobile credential management application. Accordingly, the mobile credential management application is able to display the list of credential and/or keys without communicating with the server system.

In some implementations, credential information is not stored at the client device and the user may be required to retrieve credentials and/or keys from the credential-issuing organization each time the user selects to view a list of credentials and/or keys. In these implementations, the user may be required to go through the entire authentication process each time the user selects to view the list of his/her credentials and/or keys.

In some examples, the server system 1604 may store cached versions of the credentials and/or keys and may retrieve credentials and/or keys from storage (e.g., from the cached credential data store 1610 or from the cached key data store 1616) to display when the user selects to view a list of credentials and/or keys at the mobile credential management application. In these examples, the mobile credential management application communicates with the server system 1604 to display the list of credentials and/or keys, but the user is not required to go through the entire authentication process to view the list of credentials and/or keys. Where a cached version of a credential and/or key is stored by the server system 1604, the server system 1604 may periodically request updated versions of the credential and/or key from the credential-issuing organization to ensure that the version of the credential and/or key that is displayed to the user is the most current version and that the credential and/or key has not been revoked by the credential-issuing organization.

Credentials and/or keys issued to a user by a credential-issuing organization may be cached (e.g., in the cached credential data store 1610 or in the cached key data store 1616) for a specified period of time (e.g., until a cache-until-date associated with the credential or key). The cache-until-date, for example, defines a date until which a cached version of the credential or key may be provided to the user without the server system having to communicate with the credential-issuing organization to confirm the continued validity of the credential or key. As an example, when the cache-until-date for a credential has not passed, the server system 1604 may access, from electronic storage at the server system 1604, a cached version of the credential and use the cached version of the credential to send the credential (e.g., send a user an updated list of the user's credentials) or validate the credential (e.g., confirm to another user that the user's credential is valid). When the cache-until-date for the credential has passed, the server system 1604 communicates with the credential-issuing organization that issued the credential to receive updated credentials. For example, an employer may define a cache-until-date corresponding to twenty-four hours from time of issuance for an employee credential issued to an employee by the employer. In this example, if the server system 1604 has received information for the employee credential from the employer's system less than twenty-four hours prior to the employee's attempted use of the credential (e.g., presentation of the credential to gain access to the employer's building), the server system 1604 may validate the use of the employee credential without having to communicate with the employer's system. If not, the server system 1604 communicates with the employer's system to receive updated credential information for the employee credential and validates the use of the employee credential based on the updated credential information for the employee credential.

Credentials and/or keys also may be associated with an expiration date. When a credential or key is associated with an expiration date, the credential or key may be stored by the server system 1604 until the expiration date. For instance, when the server system 1604 determines that the expiration date of a credential has passed, the server system 1604 may delete the data defining the expired credential and remove the expired credential from the user's account. In some implementations, when a key is shared between users via creating a share instance for the key, the share instance can also be associated with an expiration date/time.

The server system 1604 may, in some implementations, refresh one or more credentials and/or keys for a user. For example, the server system 1604 may refresh a credential for any appropriate reasons, such as in an effort to have an up-to-date version of the credential available to the client device through the credential management application. Refreshing a credential or key may include sending updated credential information to the client device 1600, which the client device 1600 may display and/or store. Refreshing one or more credentials or keys may occur based on actions taken by the user through the credential management application, such as providing input to display a current version of a particular credential or key or a current version of a list of credentials or keys held by the user. Credentials or keys stored on the client device 1600 also may be periodically refreshed (e.g., daily, weekly, etc.) by the server system 1604 so that the credential information stored on the client device 1600 is reasonably up-to-date.

There may be various different triggers that cause the server system 1604 to determine to refresh one or more credentials and/or keys. For example, in some implementations, the server system 1604 may determine to refresh a credential based on a cache-until-date associated with the credential expiring. For example, an employee badge may have a cache-until-date of one week. At the end of the week, the server system 1604 may determine to refresh the badge to determine if a newer version of the badge is available. Additionally or alternatively, the server system 1604 periodically may determine to refresh a credential or key to ensure that the credential or key still is valid and has not been revoked by the credential-issuing organization that issued the credential or key. The server system 1604 also may determine to refresh a credential or key in response to receiving a request to access the credential or key from the user to whom the credential or key was issued and/or in response to a request to validate the credential or key.

A user may add credentials and/or keys from more than one credential-issuing organization to his/her user account. For example, the user may wish to add a degree from a University, as well as an employee badge from his/her place of employment. In this example, the multiple credentials may be added in multiple, separate requests to add the credentials. In some implementations, a credential-issuing organization may provide several types of credentials to a user such that the user's account includes multiple, different credentials issued by the credential-issuing organization to the user. Additionally or alternatively, a user may receive credentials (and related resources, such as keys) from several different credential-issuing organizations such that the user's account includes at least a first credential (and related resources) issued by a first organization and a second credential (and related resources) issued by a second organization. The credential management system may maintain accounts for many different users, and may manage credentials and keys issued to these users by many different organizations.

The features described can be implemented in digital electronic circuitry, or in computer hardware, firmware, software, or in combinations of them. The apparatus can be implemented in a computer program product tangibly embodied in an information carrier, e.g., in a non-transitory machine-readable medium such as a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touch-screen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, various other modifications may be made without departing from the spirit and scope of the disclosure. Accordingly, other implementations are within the scope of the following claims.

What is claimed is:

1. A non-transitory computer-readable storage medium including instructions, which upon execution by one or more processors, cause the one or more processors to perform operations comprising:
   receiving, from a client device associated with a user account of a first user, a request to grant a second user access to a key associated with a credential, the credential being associated with the user account of the first user, and the request including an address of the second user, wherein the key permits access to a resource;
   in response to receiving the request, accessing, at a server system, a second user account based on the address of the second user;
   before granting the second user access to the key:
      sending, by the server system, a message to the address of the second user, the message identifying the key;
      before authenticating the second user for access to the key and before modifying one or more permissions or authorizations to grant the second user access to the key, receiving, by the server system from a device associated with the second user, (i) a second message that requests access to the key and (ii) a third message that includes authentication information for the second user; and
      authenticating, by the server system, the second user based on the received authentication information;
   in response to authenticating the second user, granting, by the server system, the second user access to the key by modifying one or more permissions or authorizations such that the second user is enabled to obtain, from the server system and using the second user account, a representation of the key that allows access to the resource;
   communicating, to the address of the second user, a message indicating that the second user account has been associated with the key;
   after the communicating, receiving, by the server system, a second request associated with the second user account; and
   in response to receiving the second request, providing, by the server system, (i) credential information indicating a set of credentials associated with the second user account, (ii) key information indicating a set of keys associated with the second user account, or (iii) both the credential information and the key information.

2. The non-transitory computer-readable storage medium of claim 1, wherein the operations further comprise:
   determining, at the server system, that the user account of the first user is authorized to provide the second user access to the key associated with the credential.

3. The non-transitory computer-readable storage medium of claim 1, wherein the operations further comprise:
   in response to receiving the authentication information for the second user, retrieving the second user account based on the authentication information.

4. The non-transitory computer-readable storage medium of claim 1, wherein the operations further comprise:
   determining that the second user does not have an account;
   sending an invitation to the to the address of the second user to invite the second user to create the second user account upon determining that the second user does not have a user account;
   receiving a response to the invitation; and
   generating the second user account based on the response.

5. The non-transitory computer-readable storage medium of claim 4, wherein the invitation includes a uniform resource locator (URL) that permits the second user to provide authentication information for generating the second user account.

6. The non-transitory computer-readable storage medium of claim 1, wherein the address of the second user is one of an e-mail address, a social network account address, a phone number, and an instant messaging account address.

7. The non-transitory computer-readable storage medium of claim 1, wherein:
   the request to grant the second user access to the key includes one or more constraints on access for the second user to the key; and
   the third message is received after the second message.

8. The non-transitory computer-readable storage medium of claim 7, wherein the one or more constraints include at least one of a time, a location, and a presence of the first user.

9. A computer-implemented method comprising:
   receiving, from a client device associated with a user account of a first user, a request to grant a second user access to a key associated with a credential, the credential being associated with the user account of the first user, and the request including an address of the second user, wherein the key permits access to a resource;

in response to receiving the request, accessing, at a server system, a second user account based on the address of the second user;

before granting the second user access to the key:
sending, by the server system, a message to the address of the second user, the message identifying the key;
before authenticating the second user for access to the key and before modifying one or more permissions or authorizations to grant the second user access to the key, receiving, by the server system from a device associated with the second user, (i) a second message that requests access to the key and (ii) a third message that includes authentication information for the second user; and
authenticating, by the server system, the second user based on the received authentication information;

in response to authenticating the second user, granting, by the server system, the second user access to the key by modifying one or more permissions or authorizations such that the second user is enabled to obtain, from the server system and using the second user account, a representation of the key that allows access to the resource;

communicating, to the address of the second user, a message indicating that the second user account has been associated with the key;

after the communicating, receiving, by the server system, a second request associated with the second user account; and in response to receiving the second request, providing, by the server system, (i) credential information indicating a set of credentials associated with the second user account, (ii) key information indicating a set of keys associated with the second user account, or (iii) both the credential information and the key information.

10. The computer-implemented method of claim 9, further comprising:
determining, at the server system, that the user account of the first user is authorized to provide the second user access to the key associated with the credential.

11. The computer-implemented method of claim 9, further comprising:
in response to receiving the authentication information for the second user, retrieving the second user account based on the authentication information.

12. The computer-implemented method of claim 9, further comprising:
determining that the second user does not have an account; sending an invitation to the to the address of the second user to invite the second user to create the second user account upon determining that the second user does not have a user account;
receiving a response to the invitation; and
generating the second user account based on the response.

13. The computer-implemented method of claim 12, wherein the invitation includes a uniform resource locator (URL) that permits the second user to provide authentication information for generating the second user account; and
wherein the address of the second user is one of an e-mail address, a social network account address, a phone number, and an instant messaging account address.

14. The computer-implemented method of claim 9, wherein:

the request to grant the second user access to the key includes one or more constraints on access for the second user to the key, the one or more constraints including at least one of a time, a location, and a presence of the first user; and
the third message is received after the second message.

15. A system comprising:
one or more computing devices and one or more storage devices storing instructions which when executed by the one or more computing devices, cause the one or more computing devices to perform operations comprising:
receiving, from a client device associated with a user account of a first user, a request to grant a second user access to a key associated with a credential, the credential being associated with the user account of the first user, and the request including an address of the second user, wherein the key permits access to a resource;

in response to receiving the request, accessing, at a server system, a second user account based on the address of the second user;

before granting the second user access to the key:
sending, by the server system, a message to the address of the second user, the message identifying the key;
before authenticating the second user for access to the key and before modifying one or more permissions or authorizations to grant the second user access to the key, receiving, by the server system from a device associated with the second user, (i) a second message that requests access to the key and (ii) a third message that includes authentication information for the second user; and
authenticating, by the server system, the second user based on the received authentication information;

in response to authenticating the second user, granting, by the server system, the second user access to the key by modifying one or more permissions or authorizations such that the second user is enabled to obtain, from the server system and using the second user account, a representation of the key that allows access to the resource;

communicating, to the address of the second user, a message indicating that the second user account has been associated with the key;

after the communicating, receiving, by the server system, a second request associated with the second user account; and in response to receiving the second request, providing, by the server system, (i) credential information indicating a set of credentials associated with the second user account, (ii) key information indicating a set of keys associated with the second user account, or (iii) both the credential information and the key information.

16. The system of claim 15, wherein the operations further comprise:
determining, at the server system, that the user account of the first user is authorized to provide the second user access to the key associated with the credential.

17. The system of claim 15, wherein the operations further comprise:
in response to receiving the authentication information for the second user, retrieving the second user account based on the authentication information.

18. The system of claim 15, wherein the operations further comprise:
- determining that the second user does not have an account; sending an invitation to the to the address of the second user to invite the second user to create the second user account upon determining that the second user does not have a user account;
- receiving a response to the invitation; and
- generating the second user account based on the response.

19. The system of claim 15, wherein the invitation includes a uniform resource locator (URL) that permits the second user to provide authentication information for generating the second user account; and
- wherein the address of the second user is one of an e-mail address, a social network account address, a phone number, and an instant messaging account address.

20. The system of claim 15, wherein:
- the request to grant the second user access to the key includes one or more constraints on access for the second user to the key, the one or more constraints including at least one of a time, a location, and a presence of the first user; and
- the third message is received after the second message.

* * * * *

UNITED STATES PATENT AND TRADEMARK OFFICE
CERTIFICATE OF CORRECTION

PATENT NO. : 9,923,879 B1
APPLICATION NO. : 14/599162
DATED : March 20, 2018
INVENTOR(S) : Siamak Ziraknejad, Hanna Jung and John Gehret Page 1 of 1

It is certified that error appears in the above-identified patent and that said Letters Patent is hereby corrected as shown below:

In the Claims

In Claim 4, Column 26, Line 39, delete "to the to the" and insert -- to the --.

In Claim 12, Column 27, Line 52, delete "to the to the" and insert -- to the --.

In Claim 18, Column 29, Line 4, delete "to the to the" and insert -- to the --.

Signed and Sealed this
Twenty-ninth Day of May, 2018

Andrei Iancu
*Director of the United States Patent and Trademark Office*